US012108203B2

(12) United States Patent
Zhang et al.

(10) Patent No.: US 12,108,203 B2
(45) Date of Patent: Oct. 1, 2024

(54) SYSTEMS, METHODS, AND DEVICES FOR ACOUSTIC OUTPUT

(71) Applicant: SHENZHEN SHOKZ CO., LTD., Guangdong (CN)

(72) Inventors: Lei Zhang, Shenzhen (CN); Xin Qi, Shenzhen (CN); Junjiang Fu, Shenzhen (CN); Zhen Wang, Shenzhen (CN); Liwei Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 179 days.

(21) Appl. No.: 17/806,505

(22) Filed: Jun. 13, 2022

(65) Prior Publication Data

US 2022/0312108 A1 Sep. 29, 2022

Related U.S. Application Data

(63) Continuation of application No. PCT/CN2020/141799, filed on Dec. 30, 2020.

(30) Foreign Application Priority Data

Mar. 31, 2020 (CN) ........................ 202010247338.2

(51) Int. Cl.
*H04R 25/00* (2006.01)
*H04R 1/10* (2006.01)
(Continued)

(52) U.S. Cl.
CPC ......... *H04R 1/2803* (2013.01); *H04R 1/1016* (2013.01); *H04R 1/105* (2013.01);
(Continued)

(58) Field of Classification Search
CPC ........................ H04R 2400/03; H04R 2400/07
See application file for complete search history.

(56) References Cited

U.S. PATENT DOCUMENTS 5,590,208 A 12/1996 Koyano et al.
6,483,917 B1 * 11/2002 Kang .................... H04R 9/066 379/433.02

(Continued)

FOREIGN PATENT DOCUMENTS

CN 101931837 A 12/2010
CN 202721792 U 2/2013

(Continued)

OTHER PUBLICATIONS

Office Action in Russian Application No. 2022117133 mailed on Dec. 20, 2022, 18 pages.

(Continued)

*Primary Examiner* — Ryan Robinson
(74) *Attorney, Agent, or Firm* — METIS IP LLC

(57) ABSTRACT

The present disclosure provides an apparatus for audio signal output. The apparatus may include a bone conduction assembly configured to generate a bone conduction acoustic wave. The apparatus may include an air conduction assembly configured to generate an air conduction acoustic wave, the bone conduction acoustic wave and the air conduction acoustic wave may represent a same audio signal. The apparatus may include a phase difference between bone conduction acoustic wave and the air conduction acoustic wave may be smaller than a threshold. The apparatus may include a housing configured to accommodate at least a portion of the bone conduction assembly and the air conduction assembly.

16 Claims, 21 Drawing Sheets

(51) Int. Cl.

| | |
|---|---|
| ***H04R 1/28*** | (2006.01) |
| ***H04R 1/34*** | (2006.01) |
| ***H04R 7/16*** | (2006.01) |
| ***H04R 9/02*** | (2006.01) |
| ***H04R 9/06*** | (2006.01) |

(52) U.S. Cl.
CPC ............... *H04R 1/345* (2013.01); *H04R 7/16* (2013.01); *H04R 9/025* (2013.01); *H04R 9/06* (2013.01); *H04R 2460/13* (2013.01)

(56) References Cited

U.S. PATENT DOCUMENTS

| | | | | |
|---|---|---|---|---|
| 10,469,935 | B2 * | 11/2019 | Kunimoto | H04R 1/1075 |
| 11,343,610 | B2 * | 5/2022 | Zhang | H04R 1/2803 |
| 2006/0262954 | A1 * | 11/2006 | Lee | H04M 1/03 381/380 |
| 2009/0052698 | A1 | 2/2009 | Rader et al. | |
| 2011/0301729 | A1 | 12/2011 | Heiman et al. | |
| 2013/0051585 | A1 * | 2/2013 | Karkkainen | H04R 1/1075 381/151 |
| 2015/0177431 | A1 * | 6/2015 | Umehara | G02B 1/02 359/361 |
| 2015/0304760 | A1 | 10/2015 | Yeh | |
| 2016/0277829 | A1 | 9/2016 | Huang | |
| 2016/0320233 | A1 | 11/2016 | Inagaki | |
| 2017/0164088 | A1 | 6/2017 | Fukuda | |
| 2017/0238096 | A1 * | 8/2017 | Nakagawa | H04R 5/0335 381/310 |
| 2018/0139543 | A1 | 5/2018 | Clerici et al. | |
| 2019/0075389 | A1 * | 3/2019 | Jan | A42B 3/306 |
| 2019/0104352 | A1 * | 4/2019 | Ozawa | H04R 1/24 |
| 2019/0132689 | A1 | 5/2019 | Qi et al. | |
| 2020/0336824 | A1 | 10/2020 | Zheng et al. | |
| 2021/0183353 | A1 | 6/2021 | Zhang et al. | |
| 2021/0329378 | A1 | 10/2021 | Zhang et al. | |

FOREIGN PATENT DOCUMENTS

| | | | | | |
|---|---|---|---|---|---|
| CN | 109121038 | A | | 1/2019 | |
| CN | 111954142 | A | | 11/2020 | |
| EP | 3125573 | A1 | | 2/2017 | |
| JP | H4301998 | A | | 10/1992 | |
| JP | 2005348193 | A | * | 12/2005 | |
| JP | 2006010809 | A | | 1/2006 | |
| JP | 2008177705 | A | | 7/2008 | |
| KR | 20090120951 | A | * | 11/2009 | |
| KR | 101506216 | B1 | * | 3/2015 | |
| KR | 20160020921 | A | * | 2/2016 | |
| WO | 2005096664 | A1 | | 10/2005 | |
| WO | WO-2007083903 | A1 | * | 7/2007 | B06B 1/045 |
| WO | WO-2018079340 | A1 | * | 5/2018 | H04R 1/00 |
| WO | 2021114259 | A1 | | 6/2021 | |

OTHER PUBLICATIONS

First Examination Report in Indian Application No. 202217036064 mailed on Nov. 9, 2022, 5 pages.
International Search Report in PCT/CN2020/141799 mailed on Mar. 30, 2021, 4 pages.
Written Opinion in PCT/CN2020/141799 mailed on Mar. 30, 2021, 5 pages.
The Extended European Search Report in European Application No. 20929619.3 mailed on Apr. 14, 2023, 10 pages.
Satoki Ogiso et al., Measurement of the Differential Transfer Function Between Bone-Conduction and Air-Conduction for Sound Localization, 2015 IEEE 4th Global Conference on Consumer Electronics, 2015, 4 pages.
Notice of Allowance in Japanese Application No. 2022-553655 mailed on Oct. 30, 2023, 6 pages.
Decision of Grant in Russian Application No. 2022117133 mailed on Oct. 16, 2023, 26 pages.
E. H. J. F. Boezeman et al., Phase Relationship between Bone and Air Conducted Impulse Signals in the Human Head, The Journal of the Acoustical Society of America, 76(1): 111-115, 1984.
Tang, Huifang et al., Measurement of Bone to Air Differential Transfer Function Based on Bone to Air Cancellation, Chinese Journal of Otology, 17(4): 593-600, 2019.

* cited by examiner

400

SYSTEMS, METHODS, AND DEVICES FOR ACOUSTIC OUTPUT

CROSS-REFERENCE TO RELATED APPLICATIONS

This application is a continuation of International Application No. PCT/CN2020/141799, filed on Dec. 30, 2020, which claims priority to Chinese Patent Application No. 202010247338.2, filed on Mar. 31, 2020, the contents of each of which are hereby incorporated by reference.

TECHNICAL FIELD

The present disclosure generally relates to acoustic output technology, in particular to an acoustic output device using both bone conduction and air conduction to provide audio signals.

BACKGROUND

Nowadays, wearable devices with acoustic output are emerging and become more and more popular. In particular, an open binaural acoustic output device (e.g., a bone conduction speaker) is increasingly used to facilitate sound conduction to a user due to its health and safety characteristics. However, the bone conduction speaker has a poor performance in a mid-low frequency range and obvious sound leakage. Therefore, it is necessary to provide an acoustic output device that outputs sounds with improved quality, enriches sounds, enhances an audio experience of a user, and reduces sound leakage as well.

SUMMARY

In one aspect of the present disclosure, an apparatus for audio signal output is provided. In some embodiments, the apparatus may include a bone conduction assembly configured to generate a bone conduction acoustic wave. The apparatus may include an air conduction assembly configured to generate an air conduction acoustic wave, the bone conduction acoustic wave and the air conduction acoustic wave may represent a same audio signal. The apparatus may include a phase difference between bone conduction acoustic wave and the air conduction acoustic wave may be smaller than a threshold. The apparatus may include a housing configured to accommodate at least a portion of the bone conduction assembly and the air conduction assembly. In some embodiments, the bone conduction assembly may include a magnetic circuit assembly configured to generate a magnetic field. The bone conduction assembly may include one or more vibration plates connected with the housing. The bone conduction assembly may include a voice coil connected with at least one of the one or more vibration plates, wherein the voice coil vibrates in the magnetic field in response to receipt of the audio signal, and drive the one or more vibrating plates to vibrate to generate the bone conduction acoustic waves.

In some embodiments, the air conduction acoustic wave may be generated based on a vibration of at least one of the bone conduction assembly or the housing when the bone conduction assembly generates the bone conduction acoustic wave.

In some embodiments, the air conduction assembly may include one or more vibration diaphragms physically connected with at least one of the bone conduction assembly or the housing, the air conduction acoustic wave may generate based on the one or more vibration diaphragms and the vibration of the at least one of the bone conduction assembly or the housing.

In some embodiments, the housing may include a space where at least one of the one or more vibration diaphragms is located in, the space may include a first cavity and a second cavity defined by the at least one of the one or more vibration diaphragms, a first portion of the housing around the first cavity may be physically connected with the bone conduction assembly and configured to transfer a vibration of the bone conduction assembly, and the air conduction acoustic wave may be led out from the second cavity.

In some embodiments, a second portion of the housing around the second cavity may be configured with one or more first holes in flow communication with the second cavity, and the air conduction wave may be let out from the first holes through the one or more first holes.

In some embodiments, a sound tube may be provided on each of the one or more first holes.

In some embodiments, the first portion of the housing may be configured with one or more second holes in flow communication with the first cavity, and the one or more second holes may be configured to adjust an air pressure in the first cavity.

In some embodiments, the one or more first holes may be configured on a first sidewall of the housing, the one or more second holes may be configured on a second sidewall of the housing, and the first sidewall may be substantially parallel with the second sidewall.

In some embodiments, the housing may be configured with one or more third holes in flow communication with at least one of the first cavity or the second cavity.

In some embodiments, at least one of the one or more second holes or the one or more third holes may be covered by an acoustic resistance material.

In some embodiments, at least one of the one or more third holes may be configured on the second sidewall of the housing.

In some embodiments, at least one of the one or more third holes may be configured with a damping structure.

In some embodiments, at least one of the one or more vibration diaphragms may include a main portion physically connected with the bone conduction assembly, the main portion may include a base plate and a sidewall formed a sub-space to accommodate at least a portion of the bone conduction assembly; and an auxiliary portion may physically connect with the housing.

In some embodiments, the auxiliary portion may include at least one of a concave area or a convex area.

In some embodiments, at least one of the one or more vibration diaphragms may include an annular structure, an inner wall of the vibration diaphragm may surround the bone conduction assembly, and an outer wall of the vibration diaphragm may be physically connected with the housing.

In some embodiments, at least one of the one or more vibration diaphragms may be located between a bottom surface of the bone conduction assembly and a bottom surface of the housing.

In some embodiments, the one or more vibration diaphragms may include a first vibration diaphragm physically connected with the bone conduction assembly and a second vibration diaphragm may physically connect with the housing.

In some embodiments, a bottom surface of the housing that may be opposite to a sidewall of the housing that contacts with a user when the user wears the apparatus includes a resonance frequency less than a threshold.

In some embodiments, the air conduction assembly may include a vibration diaphragm and a vibration transmission assembly, the vibration transmission assembly may be physically connected with the bone conduction assembly and the vibration diaphragm, and the vibration transmission assembly may be configured to transfer the vibration of the bone conduction assembly to the vibration diaphragm to generate the air conduction acoustic wave.

In some embodiments, the apparatus may further include a sound hole, the air conduction wave may be let out from the sound hole, and the vibration diaphragm may be arranged in the sound hole.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further illustrated in terms of exemplary embodiments. These exemplary embodiments are described in detail with reference to the drawings. These embodiments are not restrictive. In these embodiments, the same number represents the same structure, in which.

DETAILED DESCRIPTION

Figure 1:
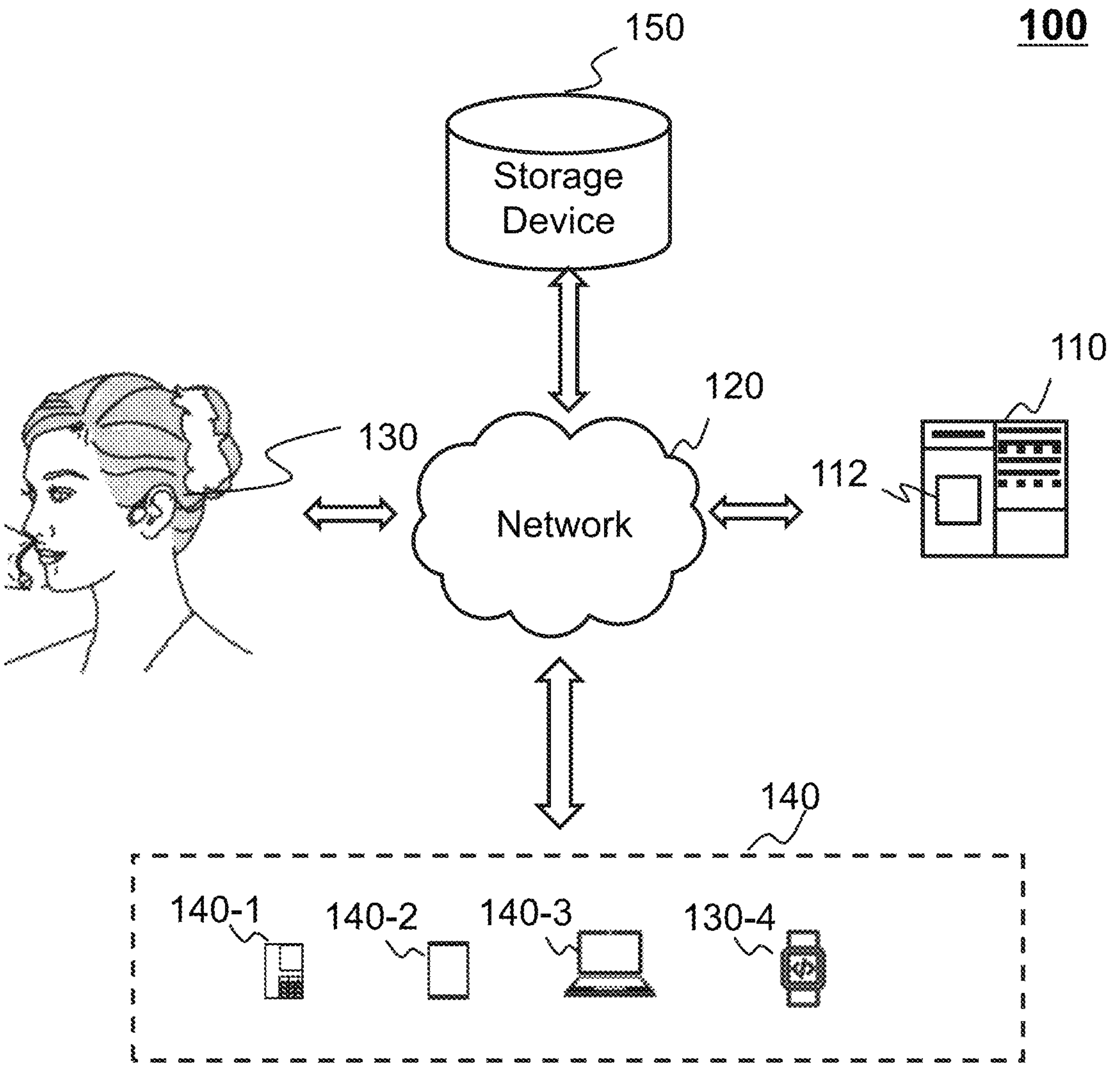
FIG. 1 is a schematic diagram illustrating an exemplary acoustic output system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, operations, elements, and/or components, but do not preclude the presence or addition of one or more other features, integers, operations, elements, components, and/or groups thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on processing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption before execution). Such software code may be stored, partially or fully, on a storage device of the executing processing device, for execution by the processing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or processing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

In order to illustrate the technical solutions related to the embodiments of the present disclosure, a brief introduction of the drawings referred to in the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

An aspect of the present disclosure relates to an acoustic output device. The acoustic output device may include a bone conduction assembly, an air conduction assembly, and a housing configured to accommodate the bone conduction assembly and the air conduction assembly. The air conduction assembly may generate air conduction acoustic waves based on the vibration of the housing and/or the bone conduction assembly when the bone conduction assembly generates bone conduction acoustic waves. Various spatial arrangements and/or frequency distributions of the bone conduction assembly and the air conduction assembly may be provided so as to enhance sound quality, enrich sounds at low frequencies, and reduce a sound leakage of the acoustic output device, thereby improving an audio experience of a user of the acoustic output device.

FIG. 1 is a schematic diagram illustrating an exemplary acoustic output system according to some embodiments of the present disclosure. The acoustic output system 100 may include a multimedia platform 110, a network 120, an acoustic output device 130, a terminal device 140, and a storage device 150.

The multimedia platform 110 may communicate with one or more components of the acoustic output system 100 or an external data source (e.g., a cloud data center). In some embodiments, the multimedia platform 110 may provide data or signals (e.g., audio data of a piece of music) for the acoustic output device 130 and/or the user terminal 140. In some embodiments, the multimedia platform 110 may facilitate data/signal processing for the acoustic output device 130 and/or the user terminal 140. In some embodiments, the multimedia platform 110 may be implemented on a single server or a server group. The server group may be a centralized server group connected to the network 120 via an access point or a distributed server group connected to the network 120 via one or more access points, respectively. In some embodiments, the multimedia platform 110 may be locally connected to the network 120 or in remote connection with the network 120. For example, the multimedia platform 110 may access information and/or data stored in the acoustic output device 130, the user terminal 140, and/or the storage device 150 via the network 120. As another example, the storage device 150 may serve as backend data storage of the multimedia platform 110. In some embodiments, the multimedia platform 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the multimedia platform 110 may include a processing device 112. The processing device 112 may perform main functions of the multimedia platform 110. For example, the processing device 112 may retrieve audio data from the storage device 150, and transmit the retrieved audio data to the acoustic output device 130 and/or the user terminal 140 to generate sounds. As another example, the processing device 112 may process signals (e.g., generating a control signal) for the acoustic output device 130.

In some embodiments, the processing device 112 may include one or more processing units (e.g., single-core processing device(s) or multi-core processing device(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the acoustic output system 100 (e.g., the multimedia platform 110, the acoustic output device 130, the user terminal 140, the storage device 150) may send information and/or data to other component(s) in the acoustic output system 100 via the network 120. In some embodiments, the network 120 may be any type of wired or wireless network, or combination thereof. Merely by way of example, the network 120 may include a cable network, a wireline network, an optical fiber network, a tele-communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points, through which one or more components of the acoustic output system 100 may be connected to the network 120 to exchange data and/or information.

The acoustic output device 130 may output acoustic sounds to a user and interact with the user. In one aspect, the acoustic output device 130 may provide the user with at least audio contents, such as songs, poems, news broadcasting, weather broadcasting, audio lessons, etc. In another aspect, the user may provide feedback to the acoustic output device 130 via, for example, keys, screen touch, body motions, voice, gestures, thoughts, etc. In some embodiments, the acoustic output device 130 may be a wearable device. Unless specified, otherwise, the wearable device as used herein may include headphones and various other types of personal devices such as head, shoulder, or body-worn devices. The wearable device may present at least audio contents to the user with or without contacting the user. In some embodiments, the wearable device may include a smart headset, a smart glass, a head mountable display (HMD), a smart bracelet, a smart footgear, a smart glass, a smart helmet, a smart watch, smart clothing, a smart backpack, a smart accessory, a virtual reality helmet, a virtual reality glass, a virtual reality patch, an augmented reality helmet, an augmented reality glass, an augmented reality patch, or the like, or any combination thereof. Merely by ways of example, the wearable device may be like a Google Glass™, an Oculus Rift™, a Hololens™, a Gear VR™, etc.

The acoustic output device 130 may communicate with the user terminal 140 via the network 120. In some embodiments, various types of data and/or information including, for example, motion parameters (e.g., a geographic location, a moving direction, a moving velocity, an acceleration, etc.), voice parameters (a volume of the voice, content of the voice, etc.), gestures (e.g., a handshake, shaking head, etc.), thoughts of the user, etc., may be received by the acoustic output device 130. In some embodiments, the acoustic output device 130 may further transmit the received data and/or information to the multimedia platform 110 or the user terminal 140.

In some embodiments, the user terminal 140 may be customized, e.g., via an application installed therein, to communicate with and/or implement data/signals processing for the acoustic output device 130. The user terminal 140 may include a mobile device 130-1, a tablet computer 130-2, a laptop computer 130-3, a built-in device in a vehicle 130-4, or the like, or any combination thereof. In some embodiments, the mobile device 130-1 may include a smart home device, a smart mobile device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, a built-in device in the vehicle 130-4 may include a built-in computer, an onboard built-in television, a built-in tablet, etc. In some embodiments, the user terminal 140 may include a signal transmitter and a signal receiver configured to communicate with a positioning device (not shown in the figure) for locating the position of the user and/or the user terminal 140. In some embodiments, the multimedia platform 110 or the storage device 150 may be integrated into the user terminal 140. In such a case, the functions that can be achieved by the multimedia platform 110 described above may be similarly achieved by the user terminal 140.

The storage device 150 may store data and/or instructions. In some embodiments, the storage device 150 may store data obtained from the multimedia platform 110, the acoustic output device 130, and/or the user terminal 140. In some embodiments, the storage device 150 may store data and/or instructions that the multimedia platform 110, the acoustic output device 130, and/or the user terminal 140 may implement various functions. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, one or more components in the acoustic output system 100 may access the data or instructions stored in the storage device 150 via the network 120. In some embodiments, the storage device 150 may be directly connected to the multimedia platform 110 as back-end storage.

In some embodiments, the multimedia platform 110, the terminal device 140, and/or the storage device 150 may be integrated onto the acoustic output device 130. Specifically, as technology advances and the processing capability of the acoustic output device 130 improves, all the processing may be performed by the acoustic output device 130. For example, the acoustic output device 130 may be a smart headset, an MP3 player, a hearing-aids, etc., with highly integrated electronic components, such as central processing units (CPUs), graphics processing units (GPUs), etc., thus having a strong processing capability.

Figure 2A:
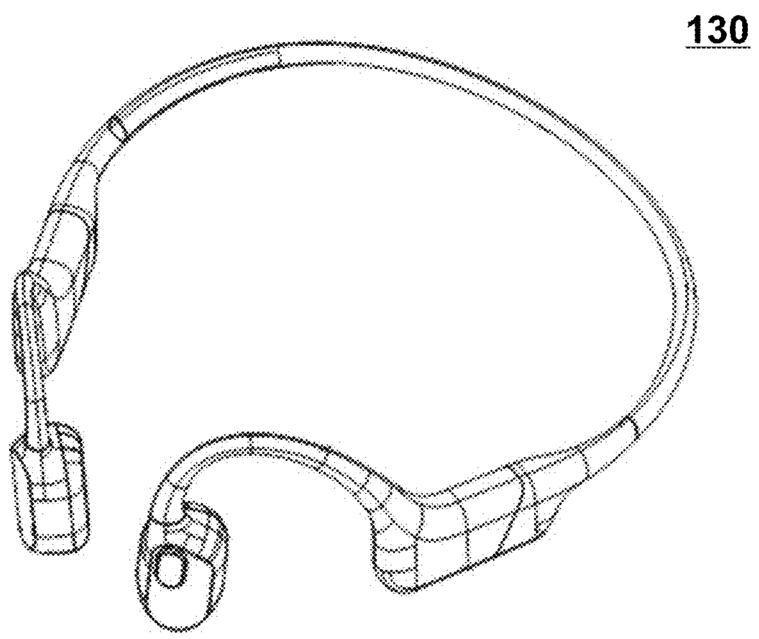
FIGS. 2A and 2B are schematic diagrams of an exemplary acoustic output device according to some embodiments of the present disclosure.
Figure 2B:
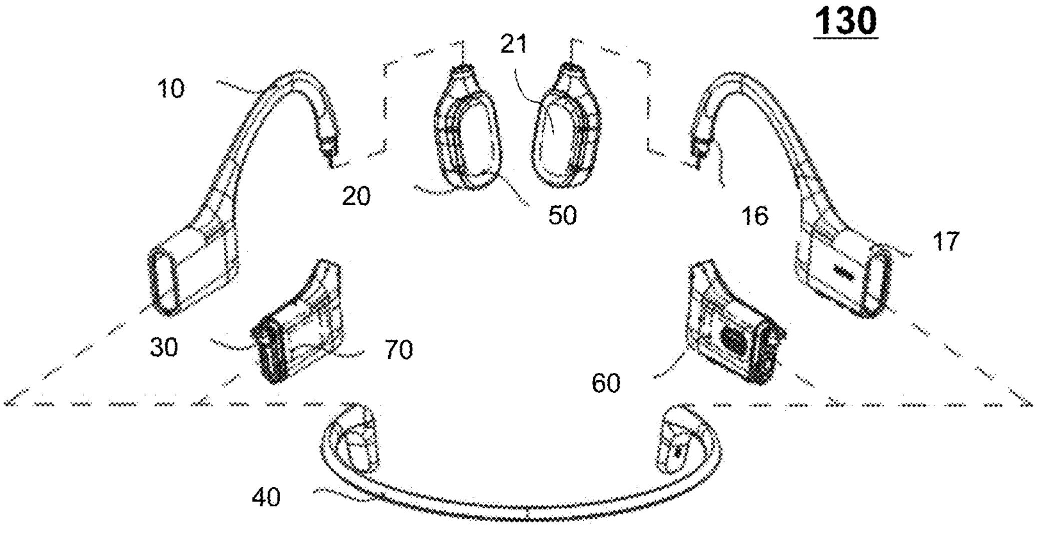

FIGS. 2A and 2B are schematic diagrams of an exemplary acoustic output device according to some embodiments of the present disclosure. FIG. 2A illustrates an oblique view of the acoustic output device 130. FIG. 2B illustrates an exploded view of the acoustic output device 130. The acoustic output device 130 may be described in combination with FIGS. 2A and 2B.

In some embodiments, the acoustic output device 130 may include ear hooks 10, earphone core housings 20, a circuit housing 30, rear hooks 40, earphone cores 50, a control circuit 60, and a battery 70. The earphone core housings 20 and the circuit housing 30 may be set at both ends of the ear hooks 10, respectively, and the rear hooks 40 may further be set at an end of the circuit housing 30 away from the ear hooks 10. The earphone core housings 20 may be used to accommodate different earphone cores 50. The circuit housing 30 may be used to accommodate the control circuit 60 and the battery 70. Two ends of the rear hooks 40 may be physically connected with the corresponding circuit housing 30, respectively. The ear hooks 10 may refer to structures configured to hang the acoustic output device 130 on the user's ears when the user wears the acoustic output device 130, and fix the earphone core housings 20 and earphone cores 50 at predetermined positions relative to the user's ears.

In some embodiments, the ear hooks 10 may include an elastic metal wire. The elastic metal wire may be configured to keep the ear hooks 10 in a shape which matches the ears of the user with a certain elasticity, so that a certain elastic deformation may occur according to the ear shape and the head shape of the user when the user wears the acoustic output device 130, thus adapting to users with different ear shapes and head shapes. In some embodiments, the elastic metal wire may be made of a memory alloy with a good deformation recovery ability. Even if the ear hooks 10 are deformed due to an external force, it may recover to its original shape when the external force is removed, thereby extending the lifetime of the acoustic output device 130. In some embodiments, the elastic wire may also be made of a non-memory alloy. A lead may be provided in the elastic metal wire to establish an electrical connection between the earphone cores 50 and other components, such as the control circuit 60, the battery 70, etc., to facilitate power supply and data transmission for the earphone cores 50. In some embodiments, the ear hooks 10 may further include a protection sleeve 16 and a housing protector 17 integrally formed with the protection sleeve 16.

In some embodiments, the earphone core housings 20 may be configured to accommodate the earphone cores 50. The earphone cores 50 may include a bone conduction assembly, an air conduction assembly, etc. The bone conduction assembly may be configured to output acoustic waves conducted through a solid medium (e.g., bones) (also referred to as bone conduction acoustic waves). For example, the bone conduction assembly may convert an electric signal to vibrations in a cranial bone of a user via direct contact with the user. The air conduction assembly may be configured to output acoustic waves conducted through air (also referred to as air conduction acoustic waves). For example, the air conduction assembly may convert the vibration of the earphone core housings 20, the bone conduction assembly, and/or the vibration of air in the earphone core housings 20 to air vibrations detectable by an ear of the user. The number of both the earphone cores 50 and the earphone core housings 20 may be two, which may correspond to the left and right ears of the user, respectively. Details regarding the earphone cores 50 can be found elsewhere in the present disclosure, for example, FIGS. 3-13.

In some embodiments, the ear hooks 10 and the earphone core housings 20 may be separately molded, and further assembled instead of directly molding the both together.

In some embodiments, the earphone core housings 20 may be provided with a contact surface 21. The contact surface 21 may be in contact with the skin of the user. As used herein, the contact surface 21 may also be referred to as the top surface of the earphone core housings 20. A surface of the earphone core housings 20 that is opposite to the top surface of the earphone core housings 20 may also be referred to as the back surface or rear surface of the earphone core housings 20. Bone conduction acoustic waves generated by one or more bone conduction assemblies of the earphone cores 50 may be transferred outside of the earphone core housings 20 (e.g., to an eardrum of the user) through the contact surface during the operation of the acoustic output device 130. In some embodiments, the material and thickness of the contact surface 21 may affect the transmission of the bone conduction acoustic waves to the user, thereby affecting the sound quality. For example, if the material of the contact surface 21 is relatively soft, the transmission of the bone conduction acoustic waves in a low-frequency range may be better than the transmission of the bone conduction acoustic waves in a high-frequency range. On the contrary, if the material of the contact surface 21 is relatively hard, the transmission of the bone conduction acoustic waves in the high-frequency range may be better than the transmission of the bone conduction acoustic waves in the low-frequency range.

Figure 3A:
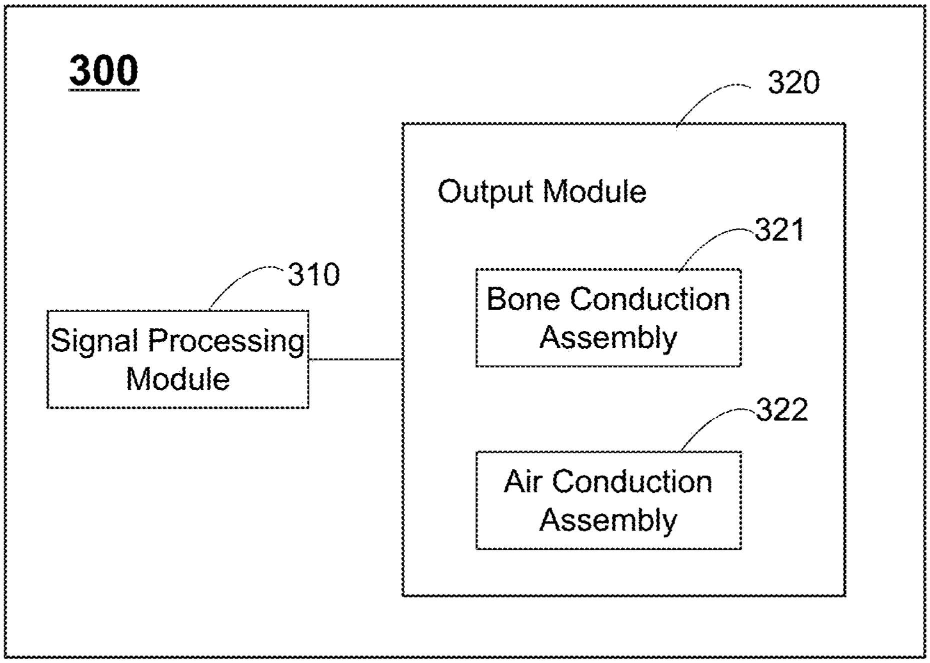
FIG. 3A is a schematic diagram of an exemplary acoustic output device according to some embodiments of the present disclosure.

FIG. 3A is a schematic diagram of an exemplary acoustic output device according to some embodiments of the present disclosure. As shown in FIG. 3A, the acoustic output device 300 may include a signal processing module 310 and an output module 320. The signal processing module 310 may receive electric signals from a signal source and process the electric signals. The electric signals may represent audio content (e.g., music) that is to be output by the acoustic output device. In some embodiments, the electric signals may be analog signals or digital signals. For example, the electric signals may be digital signals obtained from the multimedia platform 110, the terminal device 140, the storage device 150, etc.

The signal processing module 310 may process the electric signals. For example, the signal processing module 310 may process the electric signals by performing various signal processing operations, such as sampling, digitalization, compression, frequency division, frequency modulation, encoding, or the like, or a combination thereof. The signal processing module 310 may further generate control signals based on processed electric signals. The control signals may be configured to control the output module 320 to output acoustic waves (i.e., the audio content).

The output module 320 may generate and output bone conduction acoustic waves (also referred to as bone conduction sounds) and/or air conduction acoustic waves (also referred to as air conduction sounds). The output module 320 may receive the control signals from the signal processing module 310, and generate the bone conduction acoustic waves and/or the air conduction acoustic waves based on the control signals. As used herein, the bone conduction acoustic waves refer to the acoustic waves conducted in the form of mechanical vibrations through a solid medium (e.g., bones). The air conduction acoustic waves refer to acoustic waves conducted in the form of mechanical vibrations through the air.

For illustration purposes, the output module 320 may include a bone conduction assembly 321 and an air conduction assembly 322. The bone conduction assembly 321 and/or the air conduction assembly 322 may be electrically coupled to the signal processing module 310. The bone conduction assembly 321 may generate the bone conduction acoustic waves in a particular frequency range (e.g., a low-frequency range, a medium frequency range, a high-frequency range, a mid-low frequency range, a mid-high frequency range, etc.) according to the control signals generated by the signal processing module 310. The air conduction assembly 322 may generate the air conduction acoustic waves in the same or different frequency ranges as the bone conduction assembly 321 according to the vibration of the bone conduction assembly 321, the vibration of a housing accommodating the bone conduction assembly 321 and the air conduction assembly 322, the vibration of the air in the housing, and/or the control signals.

In some embodiments, the bone conduction assembly 321 and the air conduction assembly 322 may be two independent functional devices or two independent components of a single device. As used herein, that a first device is independent of a second device represents that the operation of the first/second device is not caused by the operation of the second/first device, or in other words, the operation of the first/second device is not a result of the operation of the second/first device. Taking the bone conduction assembly and the air conduction assembly as examples, the air conduction assembly is dependent on the bone conduction assembly because the air conduction assembly is driven to generate the air conduction acoustic waves by the vibration of the bone conduction assembly when the bone conduction assembly generates the bone conduction acoustic waves. As a further example, when the bone conduction assembly 321 receives the control signals from the signal processing module 310, the bone conduction assembly 321 may vibrate to generate the bone conduction acoustic waves. The vibration of the bone conduction assembly 321 may drive the vibration of the housing, and the vibration of the housing may drive the vibration of the air conduction assembly 322 to generate the air conduction acoustic waves.

Different frequency ranges may be determined according to actual needs. For example, the low-frequency range (also referred to as low frequencies) may refer to a frequency range from 20 Hz to 150 Hz, the medium frequency range (also referred to as medium frequencies) may refer to a frequency range from 150 Hz to 5 kHz, the high-frequency range (also referred to as high frequencies) may refer to a frequency range from 5 kHz to 20 kHz, the mid-low frequency range (also referred to as mid-low frequencies) may refer to a frequency range from 150 Hz to 500 Hz, and the mid-high frequency range (also referred to as mid-high frequencies) may refer to a frequency range from 500 Hz to 5 kHz. As another example, the low-frequency range may refer to a frequency range from 20 Hz to 300 Hz, the medium frequency range may refer to a frequency range from 300 Hz to 3 kHz, the high-frequency range may refer to a frequency range from 3 kHz to 20 kHz, the mid-low frequency range may refer to a frequency range from 100 Hz to 1000 Hz, and the mid-high frequency range may refer to a frequency range from 1000 Hz to 10 kHz. It should be noted that the values of the frequency ranges are merely provided for illustration purposes, and not intended to be limiting. Definitions of the above frequency ranges may vary according to different application scenarios and different classification standards. For example, in some other application scenarios, the low-frequency range may refer to a frequency range from 20 Hz to 80 Hz, the medium frequency range may refer to a frequency range from 160 Hz to 1280 Hz, the high-frequency range may refer to a frequency range from 2560 Hz to 20 kHz, the mid-low frequency range may refer to a frequency range from 80 Hz-160 Hz, and the mid-high frequency range may refer to a frequency range from 1280 Hz-2560 Hz. Optionally, different frequency ranges may have or not have overlapping frequencies.

The air conduction assembly 322 may generate and output air conduction acoustic waves in the same or different frequency ranges as air conduction acoustic waves generated by the bone conduction assembly 321.

For example, the bone conduction acoustic waves may include mid-high frequencies, and the air conduction acoustic waves may include mid-low frequencies. The air conduction acoustic waves of mid-low frequencies may be used as a supplement to the bone conduction acoustic waves of mid-high frequencies. A total output of the acoustic output device may cover the mid-low frequencies and the mid-high frequencies. In this case, better sound quality (especially at low frequencies) may be provided, and intense vibrations of the bone conduction speaker at low frequencies may be avoided.

As another example, the bone conduction acoustic waves may include mid-low frequencies, and the air conduction acoustic waves may include mid-high frequencies. In this case, the acoustic output device may provide prompts or warnings to a user via the bone conduction speaker and/or the air conduction speaker since the user is sensitive to the bone conduction acoustic waves of mid-low frequencies and/or the air conduction acoustic waves of mid-high frequencies.

As a further example, the air conduction acoustic waves may include mid-low frequencies, and the bone conduction acoustic waves may include frequencies in a wider frequency range (wide range frequencies) than the air conduction acoustic waves. The output of the mid-low frequencies may be enhanced, and the sound quality may be improved.

Figure 3B:
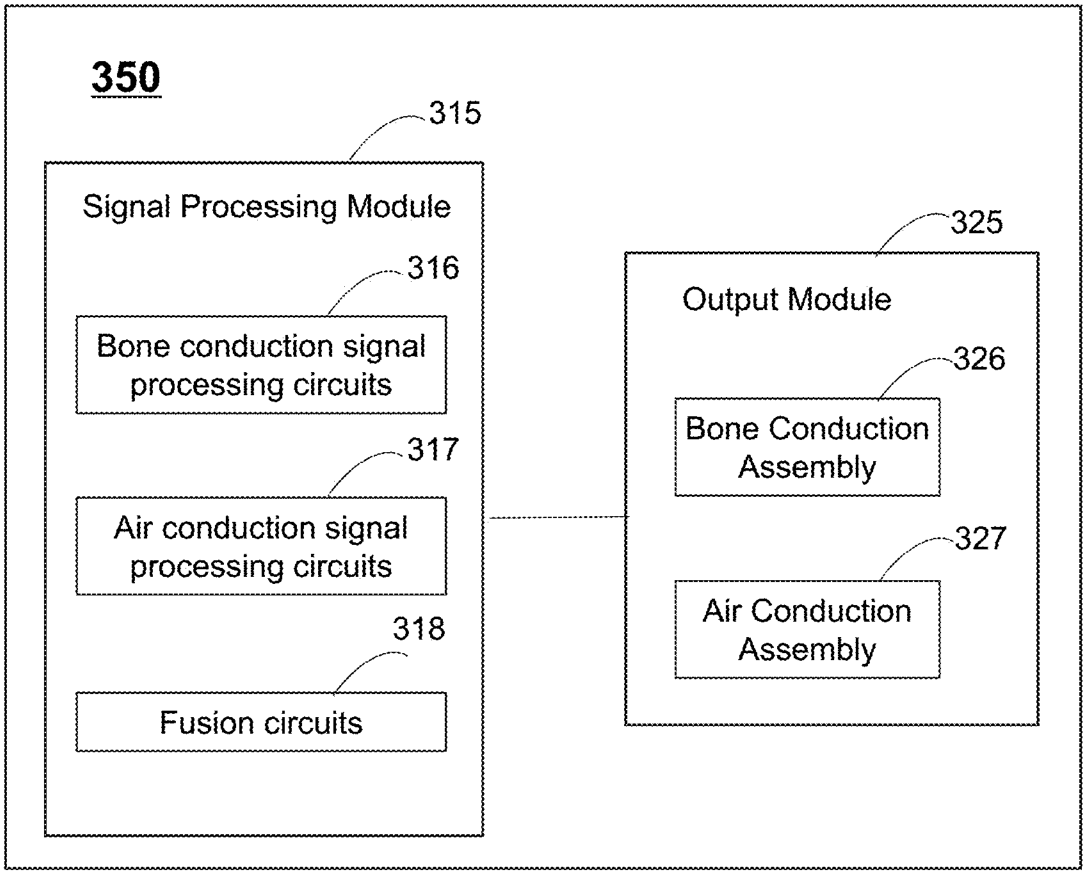
FIG. 3B is a schematic diagram of another exemplary acoustic output device according to some embodiments of the present disclosure.

FIG. 3B is a schematic diagram of another exemplary acoustic output device according to some embodiments of the present disclosure. In some embodiments, the acoustic output device 350 as illustrated in FIG. 3B may be similar to or the same as the acoustic output device 300 as illustrated in FIG. 3A, except that the acoustic output device 350 may further include bone conduction signal processing circuits 316, air conduction signal processing circuits 317, and a fusion circuits 318. The bone conduction signal processing circuits 316 may be configured to process bone conduction signals. The air conduction signal processing circuits 317 may be configured to process air conduction signals. In some embodiments, the electric signals may include bone conduction signals and air conduction signals. As used herein, the bone conduction signals refer to electric signals that relate to the bone conduction acoustic waves and/or electric signals that have an impact on the generation and output of the bone conduction acoustic waves. The air conduction signals refer to electric signals that relate to the air conduction acoustic waves and/or electric signals that have an impact on the generation and output of the air conduction acoustic waves. In some embodiments, the bone conduction signal processing circuit 316 may receive bone conduction signals from the signal source, process the bone conduction signals, and generate a corresponding bone conduction control signal. The bone conduction control signal refers to a signal that controls the generation and output of the bone conduction acoustic waves. Similarly, the air conduction signal processing circuit 317 may receive air conduction signals from the signal source (e.g., an air conduction microphone), process the air conduction signals, and generate a corresponding air conduction control signal. The air conduction control signal refers to a signal that controls the generation and output of the air conduction acoustic waves.

In some embodiments, the acoustic output device 350 may further include a fusion circuit 318 configured to combine the bone conduction control signals and the air conduction signals or combine the processed air conduction signals and the processed bone conduction signals to generate integrated control signals. For example, the bone conduction signal processing circuit 316 may determine low-frequency components in the bone conduction signals to obtain the processed bone conduction signals. The air conduction signal processing circuit 317 may determine high-frequency components in the air conduction signals to obtain the processed air conduction signals. The fusion circuit 318 may fuse the low-frequency components and the high-frequency components to generate the integrated control signals. When the bone conduction assembly 321 receives the control signals from the signal processing module 315, the bone conduction assembly 326 may vibrate to generate the bone conduction acoustic waves. The vibration of the bone conduction assembly 326 may drive the vibration of the air conduction assembly 327 to generate the air conduction acoustic waves.

The output module 325 may include a bone conduction assembly 326 and an air conduction assembly 327. The bone conduction assembly 326 and the air conduction assembly 327 may be the same as or similar to the bone conduction assembly 321 and an air conduction assembly 322 of the output module 320 in FIG. 3A, respectively, which may not be repeated here.

In some embodiments, the bone conduction assembly 326 may be electrically coupled to the bone conduction signal processing circuit 316. And the bone conduction assembly 326 may generate and output bone conduction acoustic waves in a particular frequency range according to the bone conduction control signals generated by the bone conduction signal processing circuits 316. The air conduction assembly 327 may be electrically coupled to the air conduction signal processing circuit 317. And the bone conduction assembly 327 may generate and output air conduction acoustic waves in the same or different frequency ranges as the bone conduction assembly 326 according to the air conduction control signals generated by the air conduction signal processing circuits 317.

In combination with FIG. 3A and FIG. 3B, to adjust output characteristics (e.g., a frequency, a phase, an amplitude, etc.) of the bone conduction acoustic waves and/or the air conduction acoustic waves, the bone conduction control signals and/or the air conduction control signals may be further processed in the signal processing module 310 or 315, such that the bone conduction acoustic waves and/or the air conduction acoustic waves may have different output characteristics. For example, the bone conduction control signals and/or the air conduction control signals may include specific frequencies. In some alternative embodiments, a structure of each of at least one component and/or an arrangement of at least one component within the output module 320 or 325 may be modified or optimized so that the output characteristics (e.g., frequencies) of the bone conduction acoustic waves and/or the air conduction acoustic waves may be adjusted.

In some embodiments, one or more filters or filter sets may be provided to process the bone conduction control signals and/or the air conduction control signals in the signal processing module 310 or 315 to adjust output characteristics (e.g., frequencies) of the bone conduction acoustic waves and/or the air conduction acoustic waves. Exemplary filters or filter sets may include but are not limited to, analog filters, digital filters, passive filters, active filters, or the like, or a combination thereof.

In some embodiments, a time-domain processing method may be provided to enrich the acoustic effect of the sounds output by the output module 320 or 325. Exemplary time-domain processing methods may include a dynamic range control (DRC), a time delay, and reverberation, etc.

In some embodiments, the acoustic output device 300 or 350 may also include an active leakage reduction module. In some embodiments, the active leakage reduction module may output acoustic waves directly without feedback from a reference (e.g., a microphone) to superimpose and cancel leaked acoustic waves (i.e., sound leakage) of the acoustic output device 300 or 350. The acoustic waves output from the active leakage reduction module may have the same amplitudes, the same frequencies, and inversed phases relative to leaked acoustic waves. In some alternative embodiments, the active leakage reduction module may output acoustic waves according to feedback from a reference. For example, a microphone may be placed in a sound field of the acoustic output device 300 or 350 to obtain information of the sound field (e.g., a position, a frequency, a phase, an amplitude, etc.), and provide real-time feedback to the active leakage reduction module to adjust the output acoustic waves dynamically to reduce or eliminate the sound leakage of the acoustic output device 300 or 350. In some embodiments, the active leakage reduction module may be incorporated in the output module 320 or 325.

In some embodiments, the acoustic output device 300 or 350 may further include a beam forming module. The beam forming module may be configured to form a certain sound beam of the bone conduction acoustic waves and/or the air conduction acoustic waves. In some embodiments, the beam forming module may form the certain sound beam by controlling amplitudes and/or phases of the bone conduction acoustic waves and/or the air conduction acoustic waves propagated from the output module 320 (e.g., the bone conduction assembly 321 and an air conduction assembly 322) or the output module 325 (e.g., the bone conduction assembly 326 and an air conduction assembly 327). The sound beam may be, for example, a fan-shaped beam with a certain angle. The sound beam may propagate in a particular direction to achieve a maximum sound pressure level near the human ears. At the same time, the sound pressure level at other positions in the sound field may be relatively small, thereby reducing sound leakage of the acoustic output device 300 or 350. In some embodiments, the acoustic output device 300 or 350 may produce a more ideal three-dimensional sound field using 3D sound field reconstruction techniques or local sound field control techniques, so that the user may obtain a better immersive experience in the sound field. In some embodiments, the beam forming module may also be incorporated in the output module 320 or 325.

Figure 4:
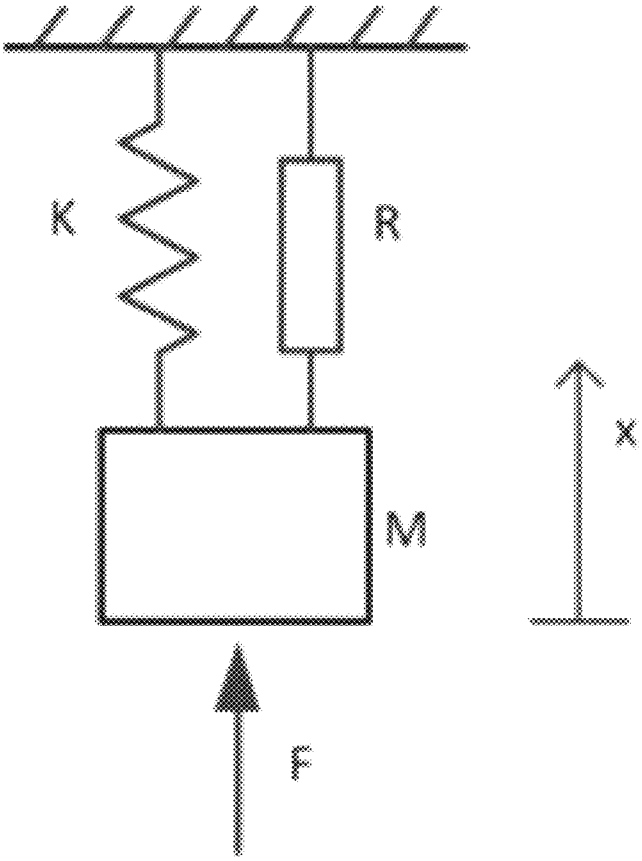
FIG. 4 is a schematic diagram of a resonance system according to some embodiments of the present disclosure.

FIG. 4 is a schematic diagram of a resonance system according to some embodiments of the present disclosure. In some embodiments, effects of structures and/or arrangements of one or more components of the acoustic output device 130 on the characteristics of the acoustic sounds output by the acoustic output device 130 may be modeled using the resonance system 400. In some embodiments, the resonance system 400 may be described in combination with a mass-spring damping system. In some embodiments, the resonance system 400 may be described in combination with a plurality of mass-spring damping systems connected in parallel or series. A motion of the resonance system 400 may be expressed in Equation (1):

$$M\frac{d^2x}{dt^2}+R\frac{dx}{dt}+Kx=F, \tag{1}$$

where M denotes the mass of the resonance system 400, R denotes damping of the resonance system 400, K denotes an elastic coefficient of the resonance system 400, F denotes a driving force, and x denotes a displacement of the resonance system 400.

In some embodiments, a resonance frequency of the resonance system 400 may be obtained by solving Equation (1). The resonance frequency of the resonance system 400 may be obtained according to Equation (2):

$$f_0 = \frac{1}{2\pi}\sqrt{\frac{K}{M}}, \tag{2}$$

where $f_0$ denotes the resonance frequency of the resonance system 400.

In some embodiments, a frequency bandwidth may be determined according to a half-power point. A quality factor Q of the resonance system 400 may be determined according to Equation (3):

$$Q = \frac{\sqrt{MK}}{R}. \tag{3}$$

In cases of a plurality of resonance systems, vibration characteristics (e.g., an amplitude-frequency response, a phase-frequency response, a transient response, etc.) of each of the plurality of resonance systems may be the same or different. For example, each of the plurality of resonance systems may be driven by the same driving force or different driving forces.

In some embodiments, each of the bone conduction assembly 321, the air conduction assembly 322, the bone conduction assembly 326, or the air conduction assembly 327 may be a single resonance system or a combination of a plurality of resonance systems. In some embodiments, the output module 320 or 325 may also include a plurality of bone conduction assemblies and/or a plurality of air conduction assemblies.

As for the bone conduction acoustic waves, frequencies and bandwidths of the bone conduction acoustic waves may be adjusted by changing the parameters exemplified above (e.g., the mass, the damping, etc.). For example, the resonance frequency may be adjusted into a mid-low frequency range by increasing the mass, reducing the elastic coefficient (e.g., using a spring with a lower elastic coefficient, using a material with a lower Young's modulus as a vibration transferring structure, reducing a thickness of a vibration transferring structure, etc.). In this case, the resonance system 400 (e.g., the bone conduction assembly) may output vibrations in the mid-low frequency range. As another example, the resonance frequency may be adjusted into a mid-high frequency band by reducing the mass of the resonance system 400, increasing the elastic coefficient of the resonance system 400 (using a spring with a higher elastic coefficient, using a material with a higher Young's modulus as the vibration transferring structure, increasing the thickness of the vibration transferring structure, etc., setting ribs or other enforcement structures to the vibration transferring structure, etc.). In this case, the resonance system 400 may output vibrations in the mid-high frequency range. As a further example, the bandwidth of the output of the vibration by resonance system 400 be adjusted by changing the quality factor Q. As a further example, a composite resonance system including a plurality of resonance systems may be provided. The resonant frequency and quality factor Q of each resonance system may be adjusted separately. A center frequency and a bandwidth of the composite resonance system may be adjusted by connecting the plurality of resonance systems in series or parallel.

As for air conduction acoustic waves, frequencies and bandwidths of the air conduction acoustic waves may be adjusted by changing the parameters exemplified above (e.g., the mass, the damping, etc.) similarly. In some embodiments, one or more acoustic structures may be provided to adjust the frequencies of the air conduction acoustic waves. The one or more acoustic structures may include, for example, an acoustic cavity, a sound conduction tube (also referred to as sound tube), a sound hole, a decompression hole, a tuning net, tuning cotton, a passive vibration diaphragm, or the like, or a combination thereof. For example, the elastic coefficient of the system 400 may be adjusted by changing the volume of the acoustic cavity. If the volume of the acoustic cavity is enlarged, the elastic coefficient of the system may be smaller. If the volume of the acoustic cavity is decreased, the elastic coefficient of the system may be larger. In some embodiments, the mass and damping of the system 400 may be adjusted by setting a sound tube or a sound hole. The longer the sound tube or the sound hole is, the smaller the cross-section will be, the greater the mass will be, and the smaller the damping will be. Conversely, the shorter the sound tube or the sound hole is, the greater the cross-section will be, the smaller the mass will be, and the greater the damping will be. In some embodiments, the damping of the system 400 may be adjusted by setting acoustic resistance materials (e.g., tuning holes, tuning nets, tuning cotton, etc.) on a path through which the air conduction acoustic waves propagate. In some embodiments, the air conduction acoustic waves in a low-frequency range may be enhanced by setting a passive vibration diaphragm. In some embodiments, the phases, amplitudes, and/or frequency ranges of the air conduction acoustic waves may be adjusted by setting one or more sound tubes and/or phase-inversion holes. In some other embodiments, an array of air conduction assemblies may be provided. The amplitude, frequency range, and phase of each air conduction assembly may be adjusted to form a sound field with a particular spatial distribution.

In some embodiments, the output characteristics of the bone conduction acoustic waves and/or air conduction acoustic waves may also be adjusted by a user (e.g., by setting an amplitude, a frequency, and/or a phase of a control signal). In some embodiments, the output characteristics of the bone conduction acoustic waves and/or air conduction acoustic waves may also be adjusted via the parameters of the resonance system 400 and the control signal set by the user.

Figure 5:
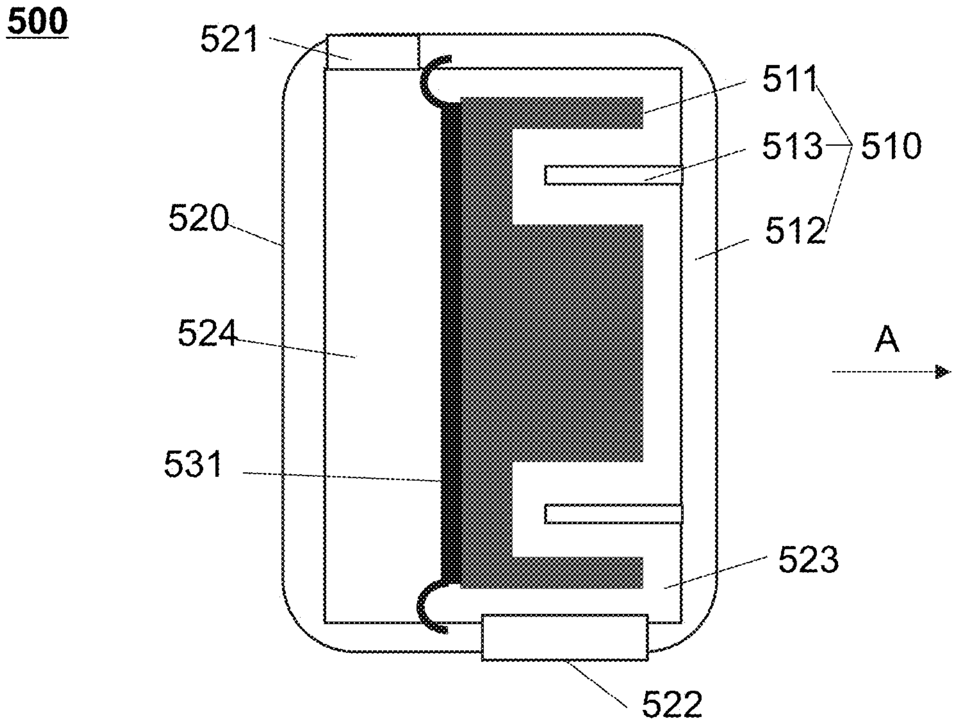
FIG. 5 is a schematic diagram illustrating an acoustic output device according to some embodiments of the present disclosure.

FIG. 5 is a schematic diagram illustrating an acoustic output device according to some embodiments of the present disclosure. As shown in FIG. 5, the acoustic output device 500 may include a bone conduction assembly 510, a housing 520, an air conduction assembly. The bone conduction assembly 510 and the air conduction assembly may be accommodated in the same housing 520 together. The bone conduction assembly 510 may generate bone conduction acoustic waves that are transmitted to a user through the housing 520, and the air conduction assembly may generate air conduction acoustic waves based on the vibration of the bone conduction assembly 510. The air conduction acoustic waves may be transmitted to the user through one or more sound outlets on the housing 520.

In some embodiments, the acoustic output device 500 may further include a signal processing module that is similar to or same as the signal processing module 310 or 315. The bone conduction assembly 510 may be electrically connected with the signal processing module to receive control signals (e.g., audio signals), and generate bone conduction acoustic waves based on the control signals. For example, the bone conduction assembly 510 may be or include any element (e.g., a vibrating motor, an electromagnetic vibrating device, etc.) that converts electric signals (e.g., the bone conduction control signals) into mechanical vibration signals. Exemplary signal conversion manners may include but are not limited to, electromagnetic types (e.g., a moving coil type, a moving iron type, a magnetostrictive type), piezoelectric types, electrostatic types, etc. Internal structures of the bone conduction assembly 510 may be a single resonance system or a composite resonance system. In some embodiments, the bone conduction assembly 510 may generate mechanical vibrations according to the bone conduction control signals. The mechanical vibrations may generate the bone conduction acoustic waves.

As illustrated in FIG. 5, the bone conduction assembly 510 may include a magnetic circuit system 511, one or more vibration plates 512, and a voice coil 513. The magnetic circuit system 511 may include one or more magnetic elements and/or magnetic guide elements that are configured to generate a magnetic field. In some embodiments, the magnetic circuit system 511 may include a magnetic gap. The magnetic circuit system 511 may generate the magnetic field in the magnetic gap. The voice coil 513 may be located in the magnetic gap. At least one of the one or more vibration plates 512 may be physically connected with the housing 520 that may contact the skin of a user (e.g., the skin on the head of the user), and transfer the bone conduction acoustic waves to a cochlea of the user when the user wears the acoustic output device. In some embodiments, one of the vibration plates 512 may also be referred to as a top wall of the housing 520. As used in the present disclosure, the "bottom" or "upper" portion of a component is described with respect to the skin of a user. For example, in the housing 520, the wall closest to the skin (e.g., the wall attached to the skin) of the user is called the top wall or front wall, and the wall most remote from the skin (e.g., the wall opposite to the top wall) of the user is called the bottom wall or back wall. The voice coil 513 may be mechanically connected to at least one of the vibration plates 512. In some embodiments, the voice coil 513 may also be electrically connected to the signal processing module. When a current (representing the control signals) is introduced into the voice coil 513, the voice coil 513 may vibrate in the magnetic field, and drive the one or more vibration plates 512 to vibrate. The vibration of the one or more vibration plates 512 may be transmitted to the bones of a user through the housing 520 to generate the bone conduction acoustic waves. In some embodiments, the vibration of the one or more vibration plates 512 may cause the vibration of the housing 520 and/or the magnetic circuit system 511. The vibration of the housing 520 and/or the magnetic circuit system 511 may cause the vibration of air in the housing 520.

The air conduction assembly may include a vibration diaphragm 531. The vibration diaphragm 531 may be physically connected with the bone conduction assembly 510 and/or the housing 520. For example, the vibration diaphragm 531 may be connected with the magnetic circuit system 511, the voice coil 513, and/or at least one of the one or more vibration plates 512. When the bone conduction assembly 510 (e.g., the one or more vibration plate 512) vibrates to generate the bone conduction acoustic waves, the vibration of the bone conduction assembly 510 (e.g., the one or more vibration plate 512) may drive the vibration of the housing 520 and/or the vibration diaphragm 531 that is physically connected with the bone conduction assembly 510 and/or the housing 520. The vibration of the vibration diaphragm 531 may cause the vibration of air in the housing 520. The air vibration in the housing 520 may be transmitted from the housing 520 to generate the air conduction acoustic waves. The air conduction acoustic waves and the bone conduction acoustic waves may represent the same audio signal that are inputted into the bone conduction assembly 510 or the same audio signal that are received by a user. As used herein, the air conduction acoustic waves and the bone conduction acoustic waves representing the same audio signal refers to that the air conduction acoustic waves and the bone conduction acoustic waves represent the same voice content that are denoted by frequency components in the air conduction acoustic waves and the bone conduction acoustic waves. The frequency components in the air conduction acoustic waves and the bone conduction acoustic waves may be different. For example, the bone conduction acoustic waves may include more low-frequency components and the air conduction acoustic waves may include more high-frequency components. In some embodiments, in the vibration process, the vibration diaphragm 531 may be physically connected with the magnetic circuit system 511, the vibration diaphragm 531 and the magnetic circuit system 511 may be considered to as immobilizing and the vibration of the housing 520 relative to the housing 520 may cause the pressure change in the first cavity 523 and the second cavity 524, thereby causing air vibration in the first cavity 523 and the second cavity 524. In some embodiments, in the vibration process, the vibration diaphragm 531 may be physically connected with the magnetic circuit system 511, the housing 520 may be considered to as immobilizing and the vibration diaphragm 531 and the magnetic circuit system 511 may vibrate relative to the housing 520, and the vibration diaphragm 531 and the magnetic circuit system 511 may cause the pressure change in the first cavity 523 and the second cavity 524, thereby causing air vibration in the first cavity 523 and the second cavity 524.

The vibration diaphragm 531 may include a thin film made of materials being sensitive to vibration. Exemplary materials of the vibration diaphragm 531 may include polyarylester (PAR), thermoplastic elastomer (TPE), polytetrafluoroethylene (PTFE), etc.

In some embodiments, the vibration diaphragm 531 may include a main portion and an auxiliary portion. The main portion may be physically connected with the bottom surface of the magnetic circuit system 511 that is away from the top wall of the housing 520. In some embodiments, the main portion may include a plate (e.g., a circle plate or an annular plate) that covers at least a portion of the bottom surface of the magnetic circuit system 511. In some embodiments, the main portion may include a base plate (e.g., a circle plate or an annular plate) that covers at least a portion of the bottom surface of the magnetic circuit system 511 and a sidewall that is connected with the sidewall of the magnetic circuit system 511. The auxiliary portion may be in an annular shape and surround the main portion. The auxiliary portion may be physically connected with the housing 520. For example, the inner side of the auxiliary portion may contact or be connected with the outside of the main portion and the outside of the auxiliary portion may be physically connected with the housing 520. In some embodiments, the auxiliary portion may include at least one of a bulge area or a groove area. More descriptions for the vibration diaphragm 531 may be found elsewhere in the present disclosure (e.g., FIGS. 14 and 15 and the descriptions thereof).

The housing 520 may include a space configured to accommodate the bone conduction assembly 510 and/or one or more components of the air conduction assembly. In some embodiments, the vibration diaphragm 531 may be located in the space and divide the space into a first cavity 523 and a second cavity 524. In some embodiments, the first cavity 523 and the second cavity 524 may be not in flow communication. In some embodiments, the first cavity 523 and the second cavity 524 may be in flow communication. For example, the vibration diaphragm 531 may be provided with one or more through-holes.

The housing 520 may include a first portion and a second portion. The first portion of the housing 520 and the vibration diaphragm 531 may form the first cavity. The first portion of the housing 520 around the first cavity may be physically connected with the bone conduction assembly 510 (e.g., the one or more vibration plates 512) and transfer the vibration of the bone conduction assembly 510 to a bone of a user when the user wears the acoustic output device 500. The second portion of the housing 520 and the vibration diaphragm 531 may form the second cavity. The air conduction acoustic waves generated by the air conduction assembly may be propagated out from the second cavity 524. As used herein, the first cavity may also be referred to as a front cavity that is closest to the skin of the user, and the second cavity may also be referred to as a back cavity that is most remote from the skin when the user wears the acoustic output device 500.

In some embodiments, the at least one sound outlet 521 may be disposed on a sidewall of the second portion of the housing 520, and the sound outlet 521 may be in communication with the second cavity 524. In some embodiments, the at least sound outlet 521 may include one or more sound holes (also referred to as one or more first holes). The sound holes may be through holes. Due to the interaction between the magnetic field and the voice coil 513, the magnetic circuit system 511 may also receive a corresponding reaction force to vibrate and excite the vibration diaphragm 531 to vibrate. The vibration of the vibration diaphragm 531 may cause the air to vibrate in the second cavity 524. The air vibration in the second cavity 524 may generate air conduction acoustic waves in the second cavity 524 that may be propagated out from the second cavity 524. In some embodiments, when the user wears the acoustic output device 500, the sound outlet 521 may face the external auditory canal of a user's ear.

In some embodiments, when the interact action between the voice coil 513 and the magnetic circuit system 511 (i.e., the vibration of the voice coil 513 under the magnetic field provided by the magnetic circuit system 511) causes the housing 520 to move toward the front side of the acoustic output device 500 (i.e., along the direction denoted by arrow A or toward the skin of the user) and the vibration diaphragm 531 (it can be considered that the housing 520 moves along the direction denoted by arrow A, while the magnetic circuit system 511 and the vibration diaphragm 531 is immobile), the first cavity 523 in the housing 520 becomes larger, the second cavity 524 becomes smaller, and the pressure inside the second cavity 524 increases. As the housing 520 moving toward the skin of the user, the pressure of the one or more vibration plates 512 acting on the skin of the user may increase, and the bone conduction acoustic waves transmitted by the bone conduction assembly 510 may be defined to be in a "positive phase." Similarly, due to the pressure inside the second cavity 524 increases, the air conduction acoustic wave generated by the air conduction assembly and led out from the second cavity 524 may be also in the "positive phase." In some embodiments, the air conduction acoustic wave and the bone conduction acoustic wave may be in the same phase, i.e., a phase difference between the air conduction acoustic wave and the bone conduction acoustic wave may be equal to 0. In some embodiments, a phase difference between the air conduction acoustic wave and the bone conduction acoustic wave may be smaller than a threshold, such as $\pi$, 2 $\pi/3$, 1 $\pi/2$, etc. As used herein, the phase difference between the air conduction acoustic wave and the bone conduction acoustic wave may refer to the absolute value of a difference between phases of the air conduction acoustic wave and the bone conduction acoustic wave. In some embodiments, difference frequency ranges of the air conduction acoustic wave and the bone conduction acoustic wave may correspond to different phase differences and different thresholds. For example, the phase difference between the air conduction acoustic wave and the bone conduction acoustic wave in a frequency range less than 300 Hz may be less than $\pi$. As another example, the phase difference between the air conduction acoustic wave and the bone conduction acoustic wave in a frequency range less than 1000 Hz (e.g., from 300 Hz to 1000 Hz) may be less than 2 $\pi/3$. As still another example, the phase difference between the air conduction acoustic wave and the bone conduction acoustic wave in a frequency range less than 3000 Hz (e.g., from 1000 Hz to 3000 Hz) may be less than 1 $\pi/2$. Therefore, the synchronism of the bone conduction sound wave and the air conduction sound wave may be increased, which may cause a superposition of the bone conduction sound wave and the air conduction sound wave, thereby improving the listening effect. A time difference between the air conduction acoustic wave and the bone conduction acoustic wave received by the user may be smaller than a threshold, such as 0.1 seconds.

In some embodiments, a decompression hole 522 (also referred to as second hole) may be set on the housing. For example, the decompression hole 522 may be set on a wall of the first portion of the housing 520. The first cavity 523 may be in flow communication with the outside of the acoustic output device 500 via the decompression hole 522. As a further example, the decompression hole 522 and the sound outlet 521 may be disposed of on different sidewalls of the housing 520. As still a further example, the decompression hole 522 and the sound outlet 521 may be disposed on different sidewalls of the housing 520 that are not adjacent, for example, substantially parallel with each other.

The decompression hole may be a through-hole that facilitates a pressure balance between the first cavity of the housing 520 and the outside. In some embodiments, the vibration of the magnetic circuit system 511 relative to the housing 520 may increase or decrease the pressure in the first cavity 523. The decompression hole 522 may adjust the pressure in the first cavity 523 by facilitating the communication between the first cavity 523 and the outside, thereby maintaining the mutual movement between the housing 520 and the magnetic circuit system 511 (and/or the vibration diaphragm 531), and ensuring the normal vibration of the housing 520.

Further, the decompression hole 522 may help adjust the frequency response of the air conduction assembly at low frequencies. It should be known that the vibration of the magnetic circuit system 511 relative to the housing 520 may cause air vibration in the first cavity 523. The acoustic waves generated by the air vibration in the first cavity 523 may be transmitted to the outside through the decompression hole 522, thus producing a sound leakage. In some embodiments, to reduce or suppress sound leakage, the decompression hole 522 may specially be designed. For example, the decompression hole 522 may have a larger size, so that a resonance peak (Helmholtz resonance) of the first cavity 523 of the housing 520 may correspond to a higher frequency. In this way, the sound leakage at mid-low frequencies propagated out of the decompression hole 522 may be suppressed greatly. Further, the larger the size of the decompression hole 522, the smaller the acoustic impedance may be, and the smaller the sound pressure value of the acoustic waves generated at the decompression hole 522 may be, which reduces the sound leakage.

In some further embodiments, a tuning net (not shown) may be provided at the decompression hole 522 to reduce the intensity of the above-mentioned resonance peak, thereby reducing the frequency response of the structure formed by the first cavity 523 and the decompression hole 522 to further reduce the sound leakage. In some embodiments, the number of the decompression holes may not be limited and may be one or more. The position of the decompression hole 522 may also be set at any position of the sidewall corresponding to the first cavity 523.

In some embodiments, by adjusting the stiffness of the vibration plate 512 and/or the housing 520 (via, e.g., structure sizes, material elastic modulus, ribs and/or other special mechanical structures), the output characteristics of the bone conduction acoustic waves may be adjusted.

In some embodiments, the output characteristics of air conduction acoustic waves may be adjusted by adjusting the shape, the elastic coefficient, and damping of the vibration diaphragm 531. The output characteristics of the air conduction acoustic waves may be adjusted by adjusting the number, a position, a size, and/or a shape of at least one of the sound outlet 521 and/or the decompression hole 522. For example, a damping structure (for example, a tuning net) may be provided at the sound outlet 521 to achieve the acoustic effect of the air conduction assembly.

It should be noted that the number, sizes, shapes (e.g., shapes of cross-sections), and/or locations of the one or more additional acoustic structures exemplified above (e.g., the sound hole, the sound tube, the decompression hole, and/or the tuning net) may be set according to actual needs and may not be limited in the present disclosure. In some embodiments, the number, the sizes, the shapes, and/or the locations of one or more additional acoustic structures may be optimized according to the sound leakage of the acoustic output device 500. In some embodiments, the optimization may be conducted according to leakage-frequency response curves provided below. Besides, spatial arrangements of the bone conduction assembly and the air conduction assembly and/or one or more components of the bone conduction assembly and the air conduction assembly may not be limited in the present disclosure. For example, a spatial arrangement of the bone conduction assembly and the air conduction assembly may vary according to actual needs, and may not be limited. As another example, a position of the vibration diaphragm 531 in the housing 520, an orientation (e.g., a direction of the front side) of the vibration diaphragm 531, etc., may vary according to actual needs, and may not be limited.

The acoustic output device provided in the present disclosure may combine a bone conduction assembly (e.g., the bone conduction assembly 510) and an air conduction assembly to provide a user with better acoustic effects and tactile feelings. In some embodiments, the bone conduction acoustic waves and the air conduction acoustic waves output by the acoustic output device may include sound waves of different frequencies.

In some embodiments, the sound outlet 521 of the acoustic output device 500 may further include a sound tube coupled to the sound hole. In some embodiments, the air conduction acoustic waves passing through the sound hole may enter the sound tube, and propagate along a particular direction via the sound tube. In this way, the sound tube may change the direction in which the air conduction acoustic waves propagate.

Figure 6:
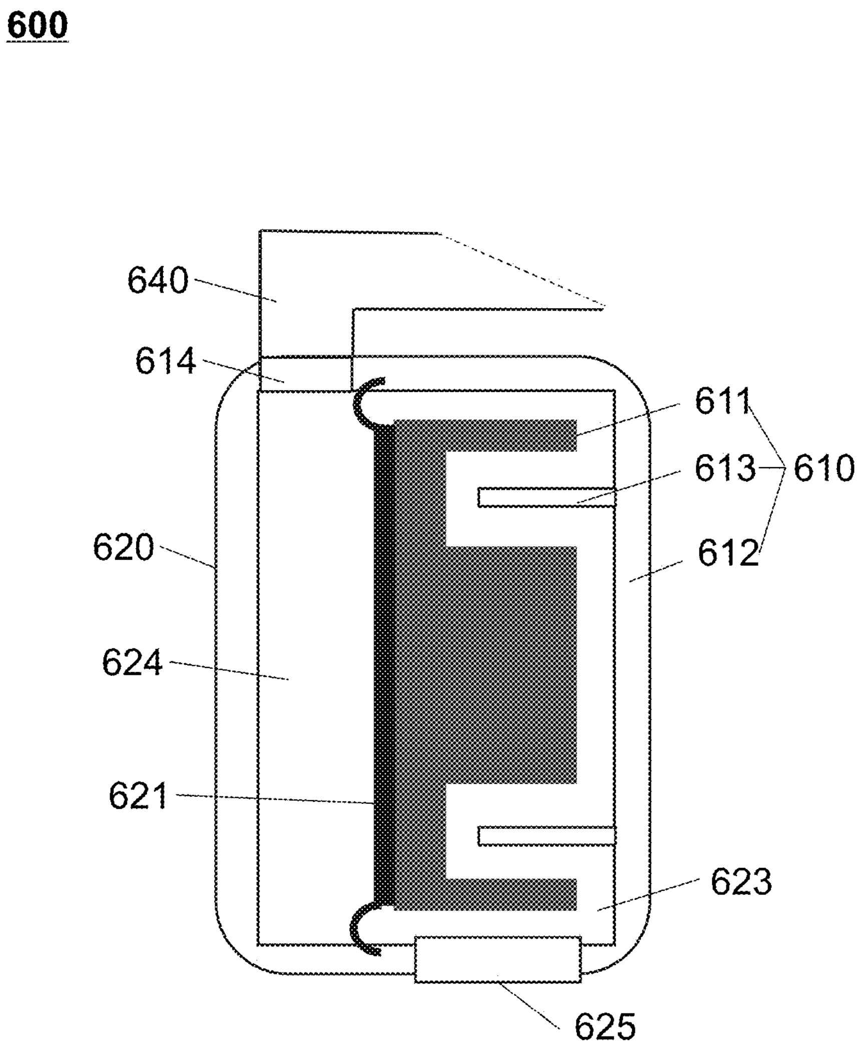
FIG. 6 is a schematic diagram illustrating an acoustic output device according to some embodiments of the present disclosure.

For example, FIG. 6 is a schematic diagram illustrating an acoustic output device according to some embodiments of the present disclosure. The acoustic output device 600 may be the same as or similar to the acoustic output device 500 in FIG. 5. For example, the acoustic output device 600 may include a bone conduction assembly 610, a housing 620, and an air conduction assembly. The bone conduction assembly 610 and the air conduction assembly may be accommodated in the same housing 620 together. As another example, the bone conduction assembly 610 may include a magnetic circuit system 611, one or more vibration plates 612, and a voice coil 613. The air conduction assembly may include a vibration diaphragm 621. As a further example, a sound outlet 614 may be disposed on the wall of the housing 620 and in flow communication with a back cavity 624, and a decompression hole 625 may be disposed on the wall of the housing 620 and in flow communication with a front cavity 623. More descriptions for the components in the acoustic output device 600 may be found elsewhere in the present disclosure (e.g., FIG. 5 and the descriptions thereof).

Different from the acoustic output device 500, the sound outlet 614 may include a sound tube 640. And the end of the sound tube 640 away from the sound outlet 614 may face toward a user's ear when the user wears the acoustic output device as shown in FIG. 6.

In some embodiments, the decompression hole 625 may be not a though hole. The decompression hole 625 may be in flow communication with the outside of the acoustic output device via the sound outlet 614 or the sound tube. As a further example, the housing 620 may include a channel. The channel may be connected with the sound outlet 614 and the sound tube 640. The air in the front cavity 623 may flow from the front cavity 623 via the decompression hole 625, the channel to the outside via the sound outlet 614, and the sound tube 640. It should be noted that the sound tube in this embodiment is also applicable to the acoustic output devices in other embodiments of the present disclosure.

Figure 7:
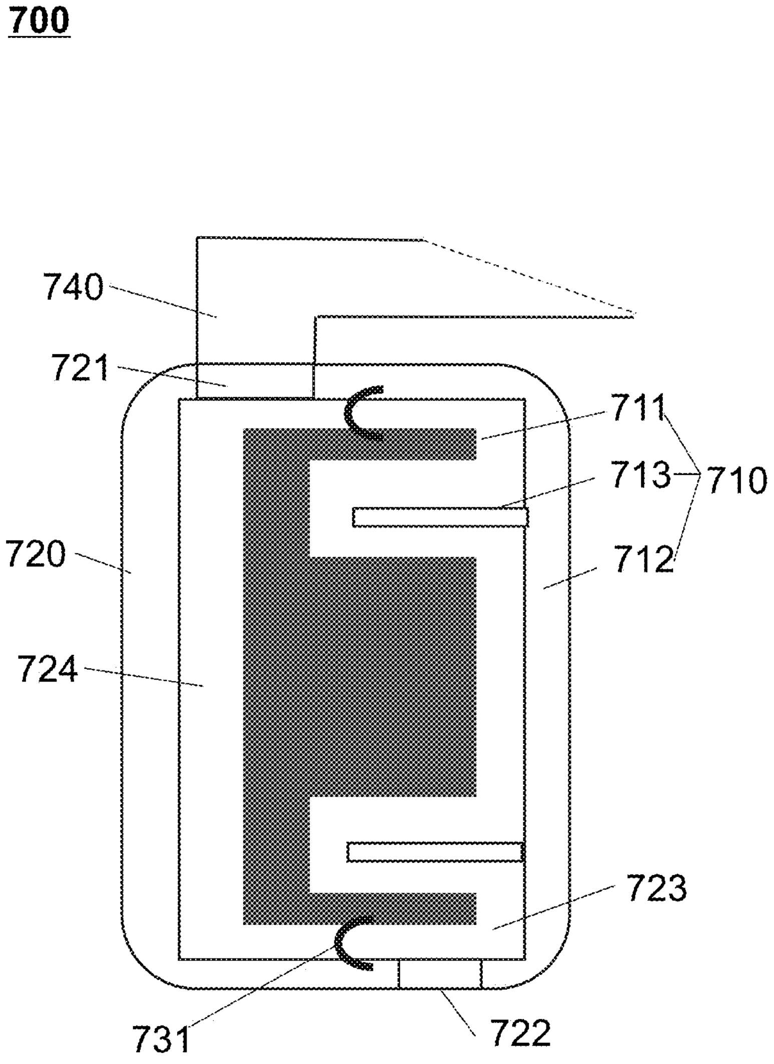
FIG. 7 is a schematic diagram illustrating an acoustic output device according to some embodiments of the present disclosure.

FIG. 7 is a schematic diagram illustrating an acoustic output device according to some embodiments of the present disclosure. The acoustic output device 700 may be the same as or similar to the acoustic output device 600 in FIG. 6. For example, the acoustic output device 700 may include a bone conduction assembly 710, a housing 720, and an air conduction assembly. The bone conduction assembly 710 and the air conduction assembly may be accommodated in the same housing 720 together. As another example, the bone conduction assembly 710 may include a magnetic circuit system 711, one or more vibration plates 712, and a voice coil 713. The air conduction assembly may include a vibration diaphragm 731 that is connected with the housing 720 and/or the bone conduction assembly 710. As a further example, a sound outlet 721 and a sound tube 740 may be disposed on a wall of the housing 720 and in flow communication with a back cavity 724 and a decompression hole 722 may be disposed on the wall of the housing 720 and in flow communication with a front cavity 723. More descriptions for the components in the acoustic output device 700 may be found elsewhere in the present disclosure (e.g., FIGS. 5 and 6 and the descriptions thereof).

As shown in FIG. 7, different from the acoustic output device 600, the vibration diaphragm 731 may be arranged around the circumference of the magnetic circuit system 711. The vibration diaphragm 731 may include an annular plate or sheet. In some embodiments, the vibration diaphragm 731 may be concave or convex that may increase the elasticity and improve the frequency response of the vibration diaphragm 731 in low-mid frequencies. Specifically, the inner side of the vibration diaphragm 731 may be physically connected with the outer wall of the magnetic circuit system 711, and the outer side of the vibration diaphragm 731 may be physically connected with the inner wall of the housing 720. The vibration diaphragm 731 that is arranged around the circumference of the magnetic circuit system 711 may reduce the space occupied by the vibration diaphragm 731, thereby reducing the bulk of the acoustic output device 700. By reducing the bulk and adjusting the position of the vibration diaphragm 731 in the housing 720, the bulk and/or weight of the acoustic output device 700 may be effectively reduced.

Figure 8:
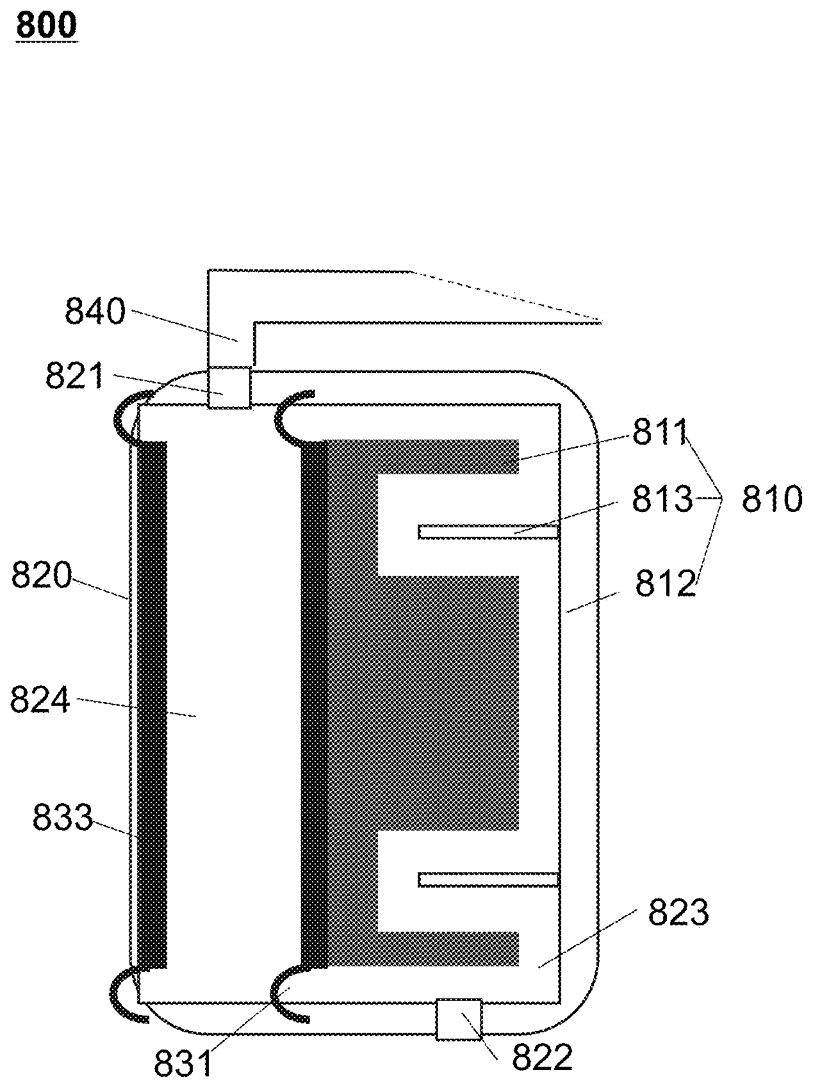
FIG. 8 is a schematic diagram illustrating an acoustic output device according to some embodiments of the present disclosure.

FIG. 8 is a schematic diagram illustrating an acoustic output device according to some embodiments of the present disclosure. The acoustic output device 800 may be the same as or similar to the acoustic output device 600 in FIG. 6. For example, the acoustic output device 800 may include a bone conduction assembly 810, a housing 820, and an air conduction assembly. The bone conduction assembly 810 and the air conduction assembly may be accommodated in the same housing 820 together. As another example, the bone conduction assembly 810 may include a magnetic circuit system 811, one or more vibration plates 812, and a voice coil 813. As a further example, a sound outlet 821 and a sound tube 840 may be disposed on a wall of the housing 820 and in flow communication with a back cavity 824, and a decompression hole 822 may be disposed on the wall of the housing 820 and in flow communication with a front cavity 823. More descriptions for the components in the acoustic output device 800 may be found elsewhere in the present disclosure (e.g., FIGS. 5 and 6 and the descriptions thereof).

As shown in FIG. 8, different from the acoustic output device 600, the air conduction assembly may include at least two vibration diaphragms. For example, the air conduction assembly may include a first vibration diaphragm 831 and a second vibration diaphragm 833. The first vibration diaphragm 831 may be the same as or similar to the vibration diaphragm 531 as described in FIG. 5.

The first vibration diaphragm 831 may be driven to vibrate by the vibration of the magnetic circuit system 811 and/or the housing 820. The second vibration diaphragm 833 may be driven to vibrate by the vibration of the housing 820 that is caused by the vibration of the magnetic circuit system 811 and/or the air vibration caused by the vibration of the first vibration diaphragm 831. The second vibration diaphragm 833 may also be referred to as a passive vibration diaphragm 833.

The second vibration diaphragm 833 may be arranged between the bottom surface of the housing 820 opposite to the position of the vibration plate 812 of the bone conduction assembly 810 and the first vibration diaphragm 831. Specially, the second vibration diaphragm 833 may be arranged between the bottom surface of the housing 820 and a plane where the sound outlet 821 is located along a direction parallel to the first vibration diaphragm 831. As shown in FIG. 8, the second vibration diaphragm 833 may be arranged near or at a bottom surface of the housing 820. The second vibration diaphragm 833 may be physically connected with the housing 820. The second vibration diaphragm 833 may be the same as or similar to the vibration diaphragm 531 as described in FIG. 5. For example, the second vibration diaphragm 833 may include a main portion and an auxiliary portion. The main portion may be near or physically connected with the bottom surface of the housing 820. The auxiliary portion may be in an annular shape and surround the main portion. The auxiliary portion may be physically connected with the housing 820. In some embodiments, the main portion may include a mass block and the auxiliary portion may include a spring.

In some embodiments, the resonance frequency of the bottom surface of the housing 820 may be determined based on a material of the bottom surface of the housing 820. In some embodiments, the material and thickness of the bottom surface of the housing 820 may affect the resonance frequency of the bottom surface of the housing 820. For example, if the material of the bottom surface of the housing 820 is relatively soft, the resonance frequency of the bottom surface of the housing 820 may be relatively low. On the contrary, if the material of the bottom surface of the housing 820 is relatively hard, the resonance frequency of the bottom surface of the housing 820 may be relatively high. The resonance frequency of the bottom surface of the housing 820 may be equal to or less than a threshold, such as equal to or less than 10 kHz, or equal to or less than 5 kHz, or equal to or less than 1 kHz, etc., by adjusting the hardness of material of the bottom surface of the housing 820.

In some embodiments, the resonance frequency of the bottom surface of the housing 820 may be determined based on the passive vibration diaphragm 833. For example, the resonance frequency of the bottom surface of the housing 820 may be equal to the resonance frequency of the passive vibration diaphragm 833.

In some embodiments, the resonance frequency of the passive vibration diaphragm 833 may exceed the frequency of the structure including the magnetic circuit system 811 and the first vibration diaphragm 831. When the vibration frequency of the magnetic circuit system 811 is less than the resonance frequency of the passive vibration diaphragm 833, the vibration of the passive vibration diaphragm 833 may be consistent with that of the housing 820. In other words, the vibration phase and frequency of the passive vibration diaphragm 833 may be consistent with that of the housing 820. The vibration of the passive vibration diaphragm 833 may be in opposite to the vibration of the first vibration diaphragm 831. The air in the back cavity 824 may be compressed or expanded and the air conduction acoustic waves may be formed along the compression or expansion of the air in the back cavity 824 when the frequency of the structure including the magnetic circuit system 811 and the first vibration diaphragm 831 less than the resonance frequency of the passive vibration diaphragm 833. And the phase of the sound leakage caused by the vibration of the passive vibration diaphragm 833 may be opposite to the phase of the sound leakage caused by the top surface of the housing 820 where the vibration plate 812 is located when the top surface of the housing 820 vibrates and presses the face caused by the vibration plate 812. The sound leakage caused by the vibration of the passive vibration diaphragm 833 and the sound leakage caused by the top surface of the housing 820 may be canceled, thereby suppressing or reducing the sound leakage of the acoustic output device 800. When the vibration frequency of the magnetic circuit system

811 is greater than the resonance frequency of the passive vibration diaphragm 833, the vibration amplitude of the passive vibration diaphragm 833 relative to the housing 520 may be very small, and the amplitude of the air compressed by the passive vibration diaphragm 833 may be very small, so the sound leakage generated by the passive vibration diaphragm 833 may be also very small.

Figure 9:
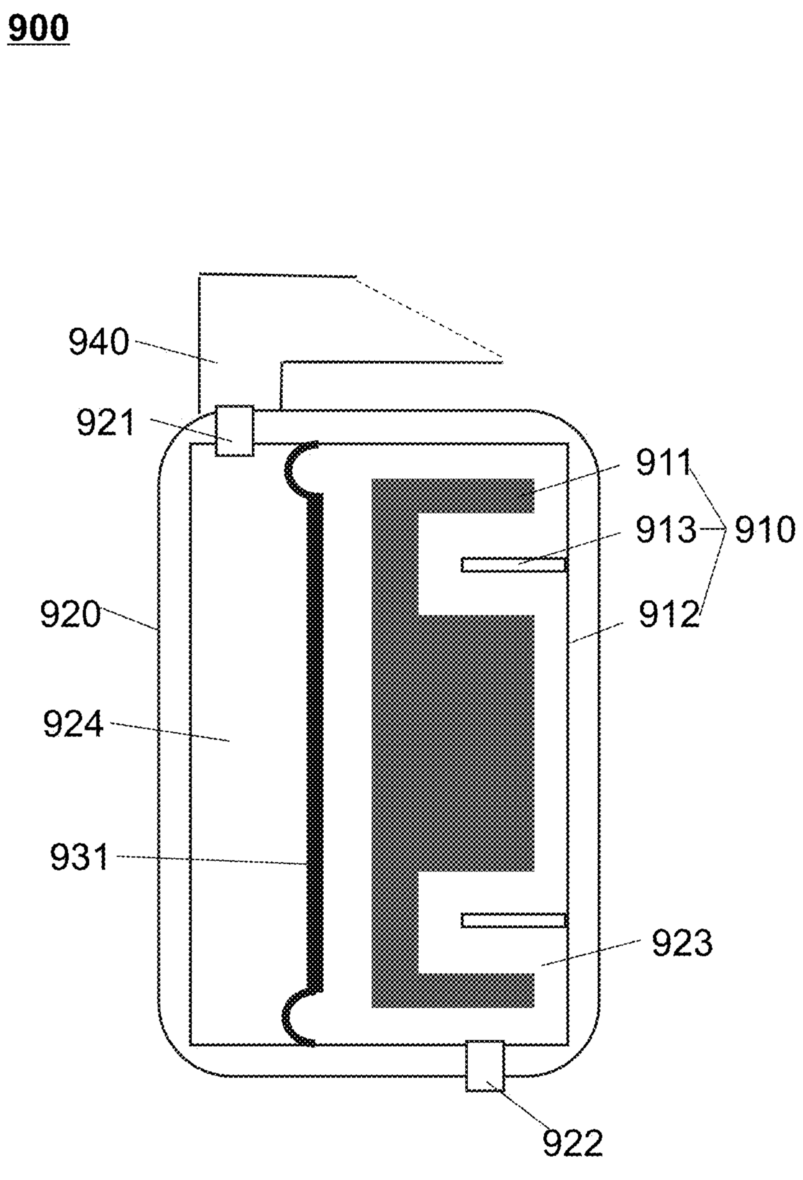
FIG. 9 is a schematic diagram illustrating an acoustic output device according to some embodiments of the present disclosure.

FIG. 9 is a schematic diagram illustrating an acoustic output device according to some embodiments of the present disclosure. The acoustic output device 900 may be the same as or similar to the acoustic output device 600 in FIG. 6. For example, the acoustic output device 900 may include a bone conduction assembly 910, a housing 920, and an air conduction assembly. The bone conduction assembly 910 and the air conduction assembly may be accommodated in the same housing 920 together. As another example, the bone conduction assembly 910 may include a magnetic circuit system 911, one or more vibration plates 912, and a voice coil 913. As a further example, a sound outlet 921 and a sound tube 940 may be disposed on a wall of the housing 920 and in flow communication with a back cavity 924, and a decompression hole 922 may be disposed on the wall of the housing 920 and in flow communication with a front cavity 923. As still another example, the air conduction assembly may include a vibration diaphragm 931. The vibration diaphragm 931 may be the same as or similar to the vibration diaphragm 531 as described in FIG. 5. More descriptions for the components in the acoustic output device 900 may be found elsewhere in the present disclosure (e.g., FIGS. 5 and 6 and the descriptions thereof).

As shown in FIG. 9, different from the acoustic output device 600, the vibration diaphragm 931 may be separated from the magnetic circuit system 911, and the vibration diaphragm 931 may be physically connected with the housing 920. The vibration of the housing 920 caused by the vibration of the bone conduction assembly 910 when the bone conduction assembly 910 generates bone conduction acoustic waves may drive the vibration of the vibration diaphragm 931. When the vibration diaphragm 931 has a smaller resonance peak (e.g., the vibration diaphragm 931 is made of a softer material, or the vibration diaphragm 931 is provided with a “wrinkle” structure that reduces its hardness), the vibration diaphragm 931 may have better response of the low-frequency vibration generated by the housing 920. In other words, the vibration diaphragm 931 may provide more low-frequency sounds, thereby increasing the volume of the low-frequency air conduction acoustic waves.

Figure 10:
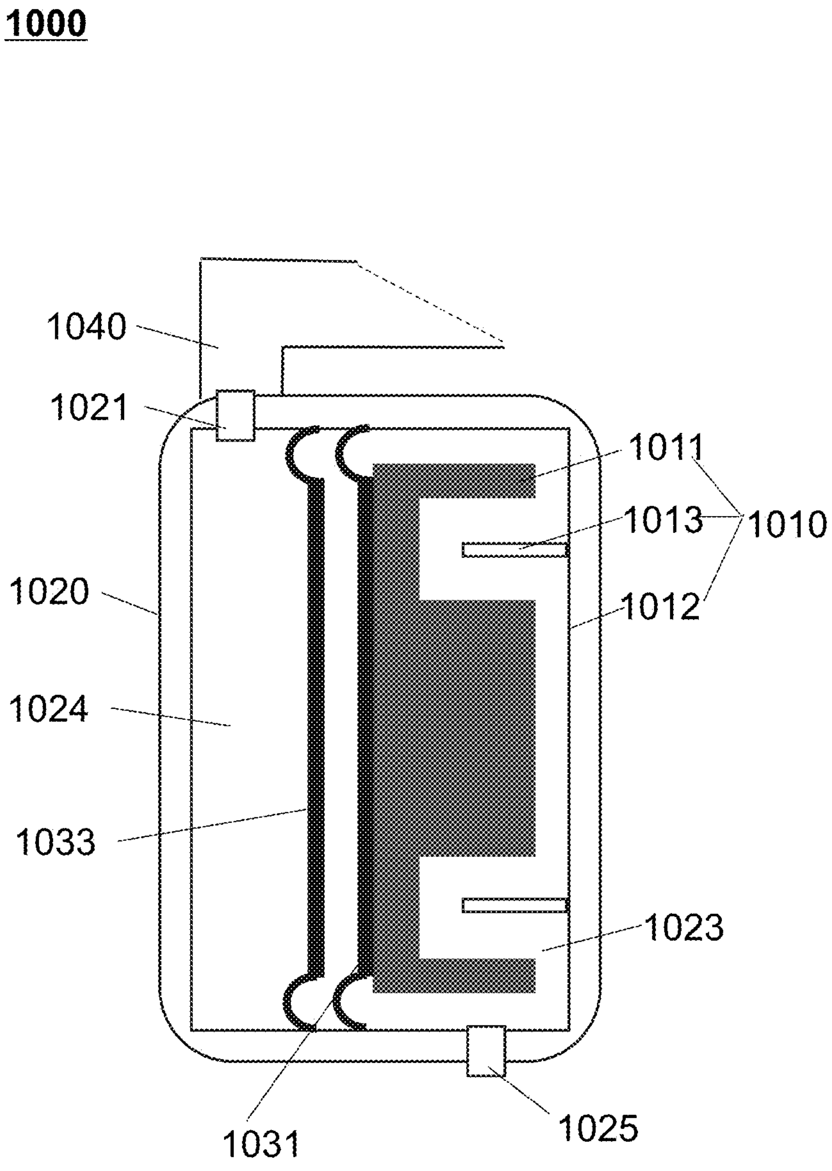
FIG. 10 is a schematic diagram illustrating an acoustic output device according to some embodiments of the present disclosure.

FIG. 10 is a schematic diagram illustrating an acoustic output device according to some embodiments of the present disclosure. The acoustic output device 1000 may be the same as or similar to the acoustic output device 500 in FIG. 5 or the acoustic output device 800 in FIG. 8. For example, the acoustic output device 1000 may include a bone conduction assembly 1010, a housing 1020, and an air conduction assembly. The bone conduction assembly 1010 and the air conduction assembly may be accommodated in the same housing 1020 together. As another example, the bone conduction assembly 1010 may include a magnetic circuit system 1011, one or more vibration plates 1012, and a voice coil 1013. As a further example, a sound outlet 1021 and a sound tube 1040 may be disposed on a wall of the housing 1020 and in flow communication with a back cavity 1024, and a decompression hole 1022 may be disposed on the wall of the housing 1020 and in flow communication with a back cavity 1024. More descriptions for the components in the acoustic output device 1000 may be found elsewhere in the present disclosure (e.g., FIGS. 5 and 6 and the descriptions thereof). As still another example, the air conduction assembly may include a first vibration diaphragm 1031 and a second vibration diaphragm 1033. The first vibration diaphragm 1031 may be the same as or similar to the vibration diaphragm 531 as described in FIG. 5. The second vibration diaphragm 1033 may be the same as or similar to the second vibration diaphragm 833 as described in FIG. 8.

As shown in FIG. 10, different from the acoustic output device 800, the second vibration diaphragm 1033 may be located in the back cavity 1024 of the housing 1020 that is separated from the bottom surface of the housing 1020. Further, the second vibration diaphragm 1033 may be located between a plane where the sound outlet 1021 is located along a direction parallel to the first vibration diaphragm 1031 and the first vibration diaphragm 1031. In some embodiments, the second vibration diaphragm 1033 may be arranged in parallel with the first vibration diaphragm 1031. In some embodiments, the second vibration diaphragm 1033 may be arranged obliquely with respect to the first vibration diaphragm 1031.

In some embodiments, the second vibration diaphragm 1033 may divide the back cavity 1024 into a first sub-cavity and a second sub-cavity. The first sub-cavity may be defined by the second vibration diaphragm 1033 and the first vibration diaphragm 1031 and the second sub-cavity may be defined by the second vibration diaphragm 1033 and the bottom surface of the housing 1020.

In some embodiments, the vibration of the housing 1020 caused by the vibration of the bone conduction assembly 1010 may cause the pressure change in the first sub-cavity between the first vibration diaphragm 1031 and the second vibration diaphragm 1033 as the magnetic circuit system 1011 and the first vibration diaphragm 1031 immobilize relative to the housing 1020. The pressure change in the first sub-cavity may cause air vibration in the first sub-cavity. The air vibration in the first sub-cavity may cause the vibration of the second vibration diaphragm 1033. The vibration of the second vibration diaphragm 1033 may cause air vibration in the second sub-cavity, and the vibration of the housing 1020 may also cause air vibration in the second sub-cavity. The phase of the air vibration caused by the vibration of the second vibration diaphragm 1033 and the phase of the air vibration caused by the vibration of the housing 1020 may be the same, which may increase the volume of the air conduction acoustic waves led out from the sound outlet 1021.

The vibration of the housing 1020 caused by the vibration of the bone conduction assembly 1010 may drive the vibration of the first vibration diaphragm 1031. The vibration of the first vibration diaphragm 1031 and/or the housing 1020 may promote the vibration of air between the first vibration diaphragm 1031 and the second vibration diaphragm 1033, and the vibration of the air between the first vibration diaphragm 1031 and the second vibration diaphragm 1033 and the vibration of the housing 1022 may drive the vibration of the second vibration diaphragm 1033. When the second vibration diaphragm 1033 has a smaller resonance peak (e.g., the second vibration diaphragm 1033 is made of a softer material, or the passive vibration diaphragm 1033 is provided with a “wrinkle” structure that reduces its hardness), the second vibration diaphragm 1033 may have a better response to the vibration of air between the first vibration diaphragm 1031 and the second vibration diaphragm 1033 caused by the low-frequency vibration generated by the bone conduction assembly 1010. In other words, the second vibration diaphragm 1033 may provide more low-frequency sounds, thereby increasing the volume of the low-frequency air conduction acoustic waves. The acoustic output device 1000 may provide rich sound (e.g., more low-frequency sound), which can increase the volume of air conduction acoustic waves.

Figure 11:
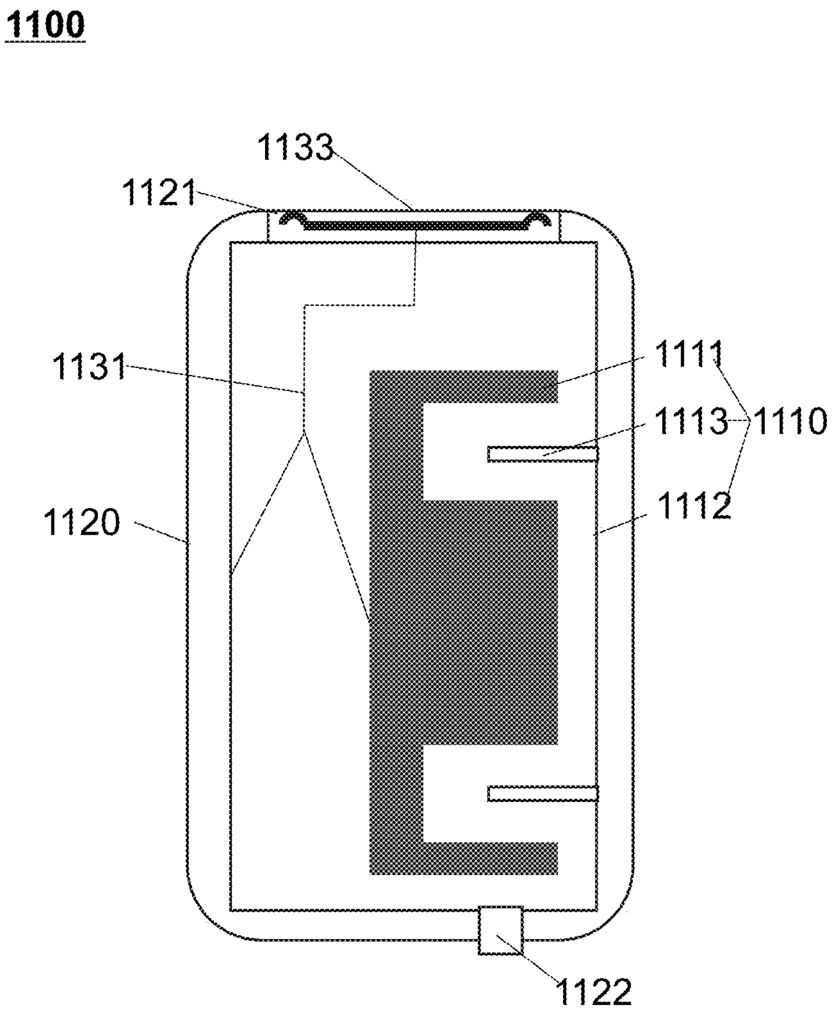
FIG. 11 is a schematic diagram illustrating an acoustic output device according to some embodiments of the present disclosure.

FIG. 11 is a schematic diagram illustrating an acoustic output device according to some embodiments of the present disclosure. As shown in FIG. 11, the acoustic output device 1100 may include a bone conduction assembly 1110, a housing 1120, and an air conduction assembly. The bone conduction assembly 1110 may be the same as or similar to the bone conduction assembly 510 of the acoustic output device 500 in FIG. 5. For example, the bone conduction assembly 1110 may include a magnetic circuit system 1111, one or more vibration plates 1112, and a voice coil 1113. More descriptions for the components of the bone conduction assembly 1110 in the acoustic output device 1100 may be found elsewhere in the present disclosure (e.g., FIG. 5 and the descriptions thereof). The acoustic output device 1100 may further include a sound outlet 1121 disposed on the housing 1120 and in flow communication with the cavity of the housing 1120 and a decompression hole 1122 may be disposed on the wall of the housing 1120 and in flow communication with the cavity of the housing 1120.

As shown in FIG. 11, different from the acoustic output device 500, the air conduction assembly may include a vibration diaphragm 1133 and a vibration transmission assembly 1131. The vibration transmission assembly 1131 may be physically connected with the bone conduction assembly 1110, the vibration diaphragm 1133, and/or the housing 1120. The vibration transmission assembly 1131 may be configured to transfer the vibration of the bone conduction assembly 1110 and/or the housing 1120 to the vibration diaphragm 1133 to generate air conduction acoustic waves. The direction of the vibration of the bone conduction assembly 1110 and/or the housing 1120 may be changed by the vibration transmission assembly 1131 during the vibration transmission. In other words, the vibration direction of the vibration diaphragm 1133 may be different from the vibration direction of the bone conduction assembly 1110 and/or the housing 1120.

In some embodiments, the vibration diaphragm 1133 may be located in the sound outlet 1121. The vibration diaphragm 1133 and the magnetic circuit system 1111 may be connected through the vibration transmission assembly 1131, and the magnetic circuit system 1111 may be connected with the housing 1120 through the vibration transmission assembly 1131. The vibration transmission assembly 1131 may include multiple connection rods. Fo example, one of the multiple connection rods may be physically connected with the vibration diaphragm 1133, one of the multiple connection rods may be physically connected with the magnetic circuit system 1111, one of the multiple connection rods may be physically connected with the housing 1120, and the multiple connection rods may be physically connected with each other.

The vibration transmission assembly 1131 may change the vibration direction of the housing 1120 and transmit the vibration of the housing 1120 with the changed vibration direction to the vibration diaphragm 1133. For example, in FIG. 11, the housing 1120 may vibrate in the left and right directions relative to the magnetic circuit system 1111, thereby generating bone conduction acoustic waves. The housing 1120 may transmit the vibration of the magnetic circuit system 1111 to the human cochlea through the top surface of the housing 1120 via the human bones. The vibration transmission assembly 1131 may convert the left and right vibration directions of the housing 1120 into up and down vibrations and transmit the vibrations to the vibration diaphragm 1133, so that the vibration diaphragm 1133 may vibrate up and down, thereby generating air conduction acoustic waves. In some embodiments, the sound outlet 1121 may directly face the direction of the human ear, that is, the vibration diaphragm 1133 vibrates in the direction toward the human ear.

Figure 12:
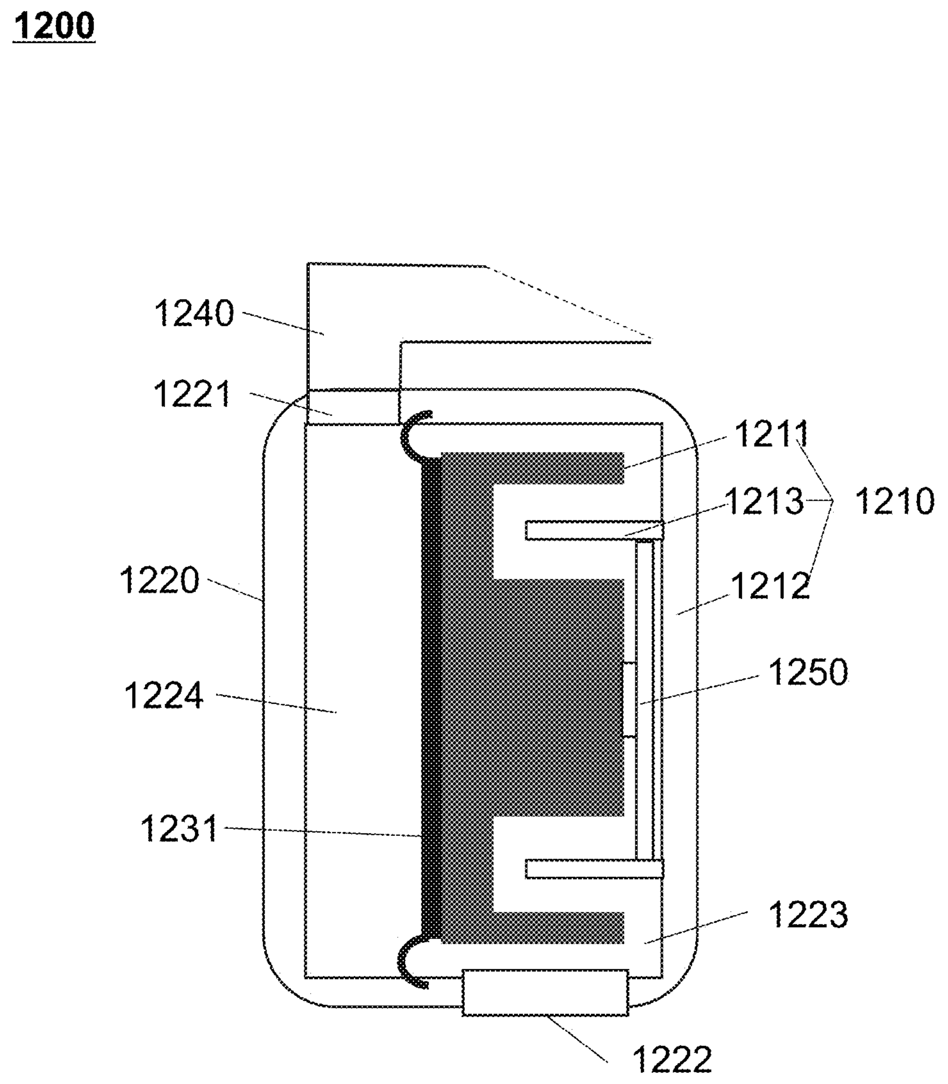
FIG. 12 is a schematic diagram illustrating an acoustic output device according to some embodiments of the present disclosure.

FIG. 12 is a schematic diagram illustrating an acoustic output device according to some embodiments of the present disclosure. The acoustic output device 1200 may be the same as or similar to the acoustic output device 600 in FIG. 6. For example, the acoustic output device 1200 may include a bone conduction assembly 1210, a housing 1220, and an air conduction assembly. The bone conduction assembly 1210 and the air conduction assembly may be accommodated in the same housing 1220 together. As another example, the bone conduction assembly 1210 may include a magnetic circuit system 1211, one or more vibration plates 1212, and a voice coil 1213. The air conduction assembly may include a vibration diaphragm 1231. As a further example, a sound outlet 1221 and a sound tube 1240 may be disposed on the housing 1220 and in flow communication with a back cavity 1224 and a decompression hole 1222 may be disposed on the sidewall of the housing 1220 and in flow communication with a front cavity 1223. More descriptions for the components in the acoustic output device 1200 may be found elsewhere in the present disclosure (e.g., FIGS. 5 and 6 and the descriptions thereof).

As shown in FIG. 12, different from the acoustic output device 600, the acoustic output device 1200 may further include an elastic member 1250 (also referred to as vibration transmission sheet) provided between the magnetic circuit system 1211 and the housing 1220. Specifically, the elastic member 1250 may be located in the front cavity 1223, and the elastic member 1250 may physically connect the magnetic circuit system 1211 and the housing 1220. The elastic member 1250 may have a better fixing effect on the magnetic circuit system 1211 and prevent the magnetic circuit system 1211 from turning over during the vibration of the housing 1220, thereby improving the sound quality effect of the acoustic output device 1200.

In addition, the elastic member 1250 may have a certain resonance frequency, which provides a resonance peak for the vibration of the housing 1220, so that the bone conduction acoustic waves generated by the bone conduction assembly 1210 may have a higher volume near the resonance peak of the elastic member 1250. In some embodiments, by adjusting one or more characteristics of the vibration diaphragm 1231 (e.g., sizes, material elastic modulus, ribs, and other special mechanical characteristics) and an elastic coefficient of the elastic member 1250, the output characteristic of the bone conduction acoustic waves may be adjusted. It should be noted that the elastic member 1250 in this embodiment is not limited to the scope of the present disclosure, and is also applicable to the acoustic output device shown in other drawings of the present disclosure.

Figure 13:
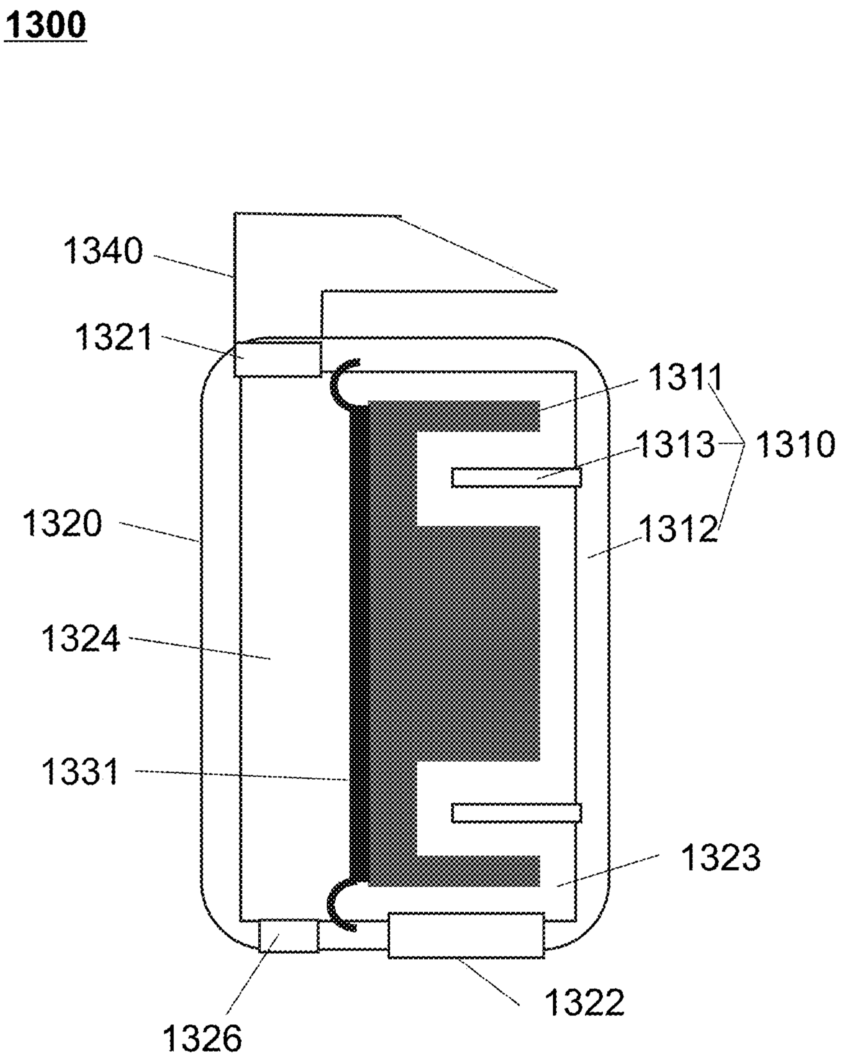
FIG. 13 is a schematic diagram illustrating an acoustic output device according to some embodiments of the present disclosure.

FIG. 13 is a schematic diagram illustrating an acoustic output device according to some embodiments of the present disclosure. The acoustic output device 1300 may be the same as or similar to the acoustic output device 600 in FIG. 6. For example, the acoustic output device 1300 may include a bone conduction assembly 1310, a housing 1320, and an air conduction assembly. As another example, the bone conduction assembly 1310 may include a magnetic circuit system 1311, one or more vibrating plates 1312, and a voice coil 1313. The air conduction assembly may include a vibration diaphragm 1331. As a further example, a sound outlet 1321 and a sound tube 1340 may be disposed on the housing 1320 and in flow communication with a back cavity 1324, and a decompression hole 1322 may be disposed on the housing 1320 and in flow communication with a front cavity 1323. More descriptions for the components in the acoustic output device 1300 may be found elsewhere in the present disclosure (e.g., FIGS. 5 and 6 and the descriptions thereof).

As shown in FIG. 13, different from the acoustic output device 600, the housing 1320 may be provided with at least one debugging hole 1326 (also referred to as third hole). In some embodiments, the debugging hole 1326 may be located on a sidewall not adjacent to a sidewall of the housing where the sound outlet 1321 is located. In some embodiments, the debugging hole 1326 may be located on one or more sidewalls adjacent to the sidewall where the sound outlet 1321 is located. For example, the housing 1320 may include at least four sidewalls physically connected in sequence. The sound outlet 1321 may be disposed on a first sidewall and the decompression hole 1322 may be disposed on a second sidewall that is not adjacent to the first sidewall. The first sidewall and the second sidewall may be substantially parallel. The debugging hole 1326 may be disposed on the second sidewall, a third sidewall, a fourth wall, etc. The third sidewall and the fourth sidewall may be adjacent to the first sidewall. The size (e.g., area) may be in a range from 1 to 50 square millimeters, or in a range from 5 to 30 square millimeters, or in a range from 10 to 20 square millimeters, etc.

In some embodiments, the debugging hole 1326 may be located on a sidewall opposite to a sidewall of the housing where the sound outlet 1321 is located to increase the resonance frequency of the air in the back cavity 1324 and/or in the front cavity 1323. In some embodiments, the resonance frequencies of the air in the back cavity 1324 and in the front cavity 1323 may be the same. In some embodiments, the resonance frequencies of the air in the back cavity 1324 and/or in the front cavity 1323 may be equal to or exceed 4000 Hz, or equal to or exceed 5000 Hz, etc. In some embodiments, the resonance frequency of the air in the back cavity 1324 may be in a range from 5500 Hz to 6000 Hz, or in a range from 4000 Hz to 6000 Hz, etc. In some embodiments, the resonance frequency of the air in the front cavity 1323 may be in a range from 4500 Hz to 5000 Hz, or in a range from 4000 Hz to 5000 Hz, etc. The resonance frequencies of the air in the back cavity 1324 and in the front cavity 1323 may be adjusted as described in FIG. 4 and the descriptions thereof.

In some embodiments, the debugging hole 1326 and/or the decompression hole 1322 may be through holes. In some embodiments, the debugging hole 1326 and/or the decompression hole 1322 may be not through holes. The debugging hole 1326 and/or the decompression hole 1322 may be in flow communication with the outside of the acoustic output device via the sound outlet 1321 or the sound tube 1340. As a further example, the housing 1320 may include a channel (or communicating tube). The channel may be connected with the sound outlet 1321 and the sound tube 1340. The air in the front cavity 1323 and/or the back cavity 1324 may flow from the front cavity 1323 and/or the back cavity 1324 via the decompression hole 1322 and/or the debugging hole 1326, the channel to the outside via the sound outlet 1321 and the sound tube 1340.

In some embodiments, the debugging hole 1326 and/or the decompression hole 1322 may be through holes. The at least one of the one or more second holes or the one or more third holes may be covered by an acoustic resistance material, such as cotton. The acoustic resistance material may include the acoustic resistance in a range 5 to 500 MKS ralys, or in a range 10 to 260 MKS ralys, or in a range from 20 to 200 MKS ralys, etc.

The air conduction sound waves (also referred to as original air conduction sound waves) generated by the air conduction assembly may collide with the bottom surface of the housing 1320 and be reflected by the bottom surface of the housing 1320 during the transmission process. The reflected air conduction sound waves and the original air conduction sound waves may form standing waves, which result in a distortion of the sound output at the sound outlet 1321. In this embodiment, by arranging the debugging hole 1326 on the housing 1320, a portion of the air conduction sound waves may be directly output from the debugging hole 1326, preventing the portion of the air conduction sound waves from reflecting and forming the standing waves with the original air conduction sound waves.

In some embodiments, the housing 1320 may further include a communicating tube (not shown) for connecting the front cavity 1323 and the back cavity 1324. For example, the communicating tube may be arranged between the decompression hole 1322 and the debugging hole 1326. The sound output by an end of the communicating tube at the front cavity 1323 may be in the opposite phase to the sound output by another end of the communicating tube at the back cavity 1324, which may be canceled by each other, thereby achieving a better effect on sound leakage reduction.

In some embodiments, the decompression hole 1322 may be provided with a damping structure (e.g., a tuning net). The damping structure provided for the decompression hole 1322 may be configured to improve the acoustic resistance and adjust (e.g., decrease) the amplitude of acoustic waves leaked from the decompression hole 1322.

In some embodiments, to increase the volume of the sound output by the sound tube 1340 and reduce the volume of the sound leakage at the debugging hole 1326, a damping structure (e.g., a tuning net) may be provided at the debugging hole 1326. The damping structure provided for the debugging hole 1326 may be configured to improve the acoustic resistance and adjust (e.g., decrease) the amplitude of acoustic waves leaked from the debugging hole 1326. When the amplitude of acoustic waves leaked from the debugging hole 1326 and amplitude of acoustic waves leaked from the decompression hole 1322, the acoustic waves leaked from the debugging hole 1326 and the acoustic waves leaked from the decompression hole 1322 may be canceled, which may reduce the sound leakage, improve the volume of sound output from the sound tube 1340.

It should be noted that the debugging hole 1326 in this embodiment is not limited to the embodiment shown in FIG. 13, and can also be applied to FIGS. 5-12 and the embodiment shown in FIG. 13 or similar acoustic output devices. In some embodiments, the numbers of the debugging holes and the decompression holes may be the same or different.

Figure 14:
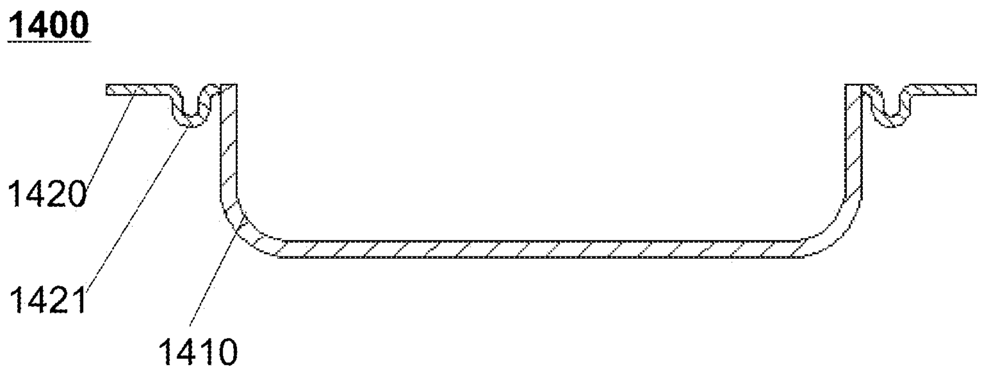
FIG. 14 and FIG. 15 are cross-sectional views of vibration diaphragms according to some embodiments of the present disclosure.
Figure 15:
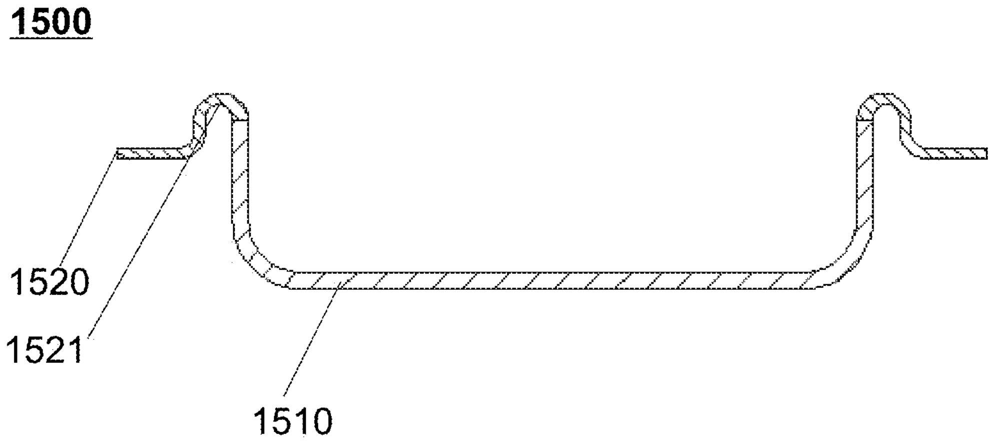

FIG. 14 and FIG. 15 are cross-sectional views of vibration diaphragms according to some embodiments of the present disclosure. As shown in FIG. 14, the vibration diaphragm 1400 may include a main portion 1410 and an extension portion 1420. The main portion 1410 may include a base plate and a sidewall. The base plate and the sidewall may form a space that may be configured to accommodate at least a portion of a magnetic circuit system as described elsewhere in the present disclosure.

The extension portion 1420 may be flush with the top of the main portion 1410 (e.g., the top of the sidewall of the main portion 1410), and the extension portion 1420 may have a concave area 1421 that sags toward the base plate of the main portion 1410. In some embodiments, an elastic coefficient of the vibration diaphragm 1400 may be adjusted by adjusting characteristics of the vibration diaphragm 1400, such as the height of the main portion 1410, the height of the extension portion 1420 relative to the main portion 1410, the height of the concave area 1421, the thickness of the main portion 1410 and/or the extension portion 1420, etc. For example, the greater the height of the concave area 1421 is, the smaller the thickness of the extension portion 1420 is, and the greater the count of the concave areas is, the greater the elastic coefficient of the vibration diaphragm 1400 may be.

The vibration diaphragm 1500 as shown in FIG. 15 may be similar to the vibration diaphragm 1400 as shown in FIG. 14. For example, the vibration diaphragm 1500 may include a main portion 1510 and an extension portion 1520. Different from the vibration diaphragm 1400, the extension portion 1520 may have a concave area 1521 that protrudes away from the base plate of the main portion 1510. In some embodiments, the elastic coefficient of the vibration diaphragm 1500 may be adjusted by adjusting characteristics of the vibration diaphragm 1500, such as the height of the main portion 1510, the height of the extension portion 1520 relative to the main portion 1510, the height of the concave area 1521, the thickness of the main portion 1510 and/or the extension portion 1520, etc. For example, the greater the height of the concave area 1521 is, the smaller the thickness of the extension portion 1520 is, and the greater the count of the convex areas is, the greater the elastic coefficient of the vibration diaphragm 1500 may be.

Comparing the vibration diaphragm 1400 shown in FIG. 14 and the vibration diaphragm 1500 shown in FIG. 15, the vibration diaphragm 1400 may have a smaller elastic coefficient and a lower low-frequency resonance frequency than the vibration diaphragm 1500 when the vibration diaphragm 1400 and vibration diaphragm 1500 include the same material. In some embodiments, the extension portion 1420 of the vibration diaphragm 1400 and the extension portion 1520 of the vibration diaphragm 1500 may be provided with holes (not shown). The holes may be through holes, and the first cavity and the second cavity of the housing of an acoustic output device as described elsewhere in the present disclosure may be in flow communication via the holes. Since the sounds generated at both ends of the holes are opposite in phase and offset each other, the sound leakage generated by the acoustic output device (for example, the sound leakage from the decompression hole) may be reduced effectively. The vibration diaphragm 1500 and the vibration diaphragm 1500 provided in this embodiment may be applied to the above-mentioned acoustic output device (for example, the acoustic output device shown in FIGS. 5-13, thereby improving the sound output effect of the acoustic output device and reducing sound leakage.

Figure 16:
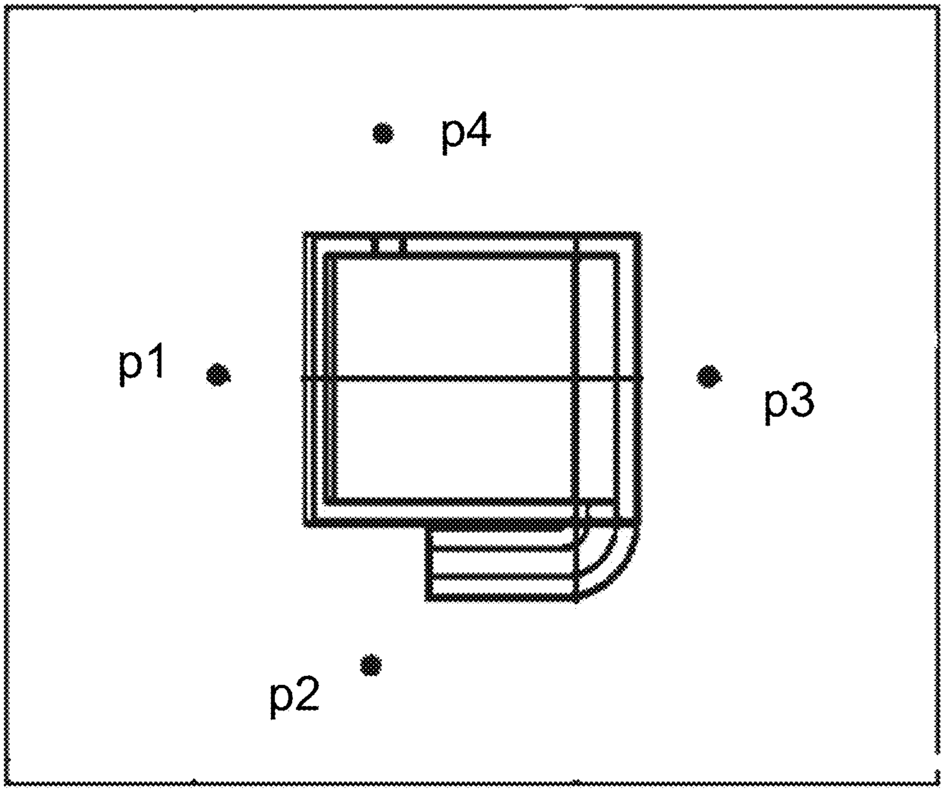
FIG. 16 is a schematic diagram of different positions relative to an acoustic output device according to some embodiments of the present disclosure.

FIG. 16 is a schematic diagram of different positions relative to an acoustic output device according to some embodiments of the present disclosure. As shown in FIG. 16, four positions relative to an acoustic output device denoted by points p1, p2, p3, and p4 are shown. P1 is located at a position that is near to the skin of a user when a user wears the acoustic output device. P1 may be also referred to as the front side of the acoustic output device. P3 is located at a position that is away from the skin of a user when a user wears the acoustic output device. P3 may be also referred to as the back side of the acoustic output device. P2 is located at a position near a sound tube as described elsewhere in the present disclosure. P4 is located at a position near a decompression hole as described elsewhere in the present disclosure.

FIGS. 17-21 are schematic diagrams of leakage-frequency response curves of different positions relative to different acoustic output devices as described in FIG. 16 according to some embodiments of the present disclosure. A leakage-frequency response curve of an acoustic output device refers to a curve representing a variation of the sound leakage of the acoustic output device along with the frequency of a sound signal. The horizontal axis may represent the frequency of the sound signal inputted into the acoustic output device. The vertical axis may be a volume of a sound leakage of the acoustic output device at a position (e.g., p1, p2, p3, p4). Leakage-frequency response curves L1-L4 as shown in each of FIGS. 17-21 represents a variation of the sound leakage of the acoustic output device at positions p1-p4, respectively along with the frequency of a sound signal. Leakage-frequency response curves S1-S5 as shown in each of FIGS. 22-25 represents a variation of the sound leakage of different acoustic output devices at each of positions p1-p4, respectively along with the frequency of a sound signal.

Figure 17:
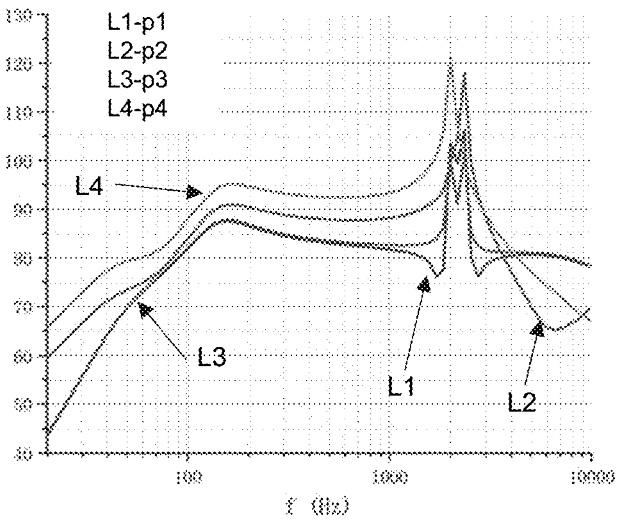
FIGS. 17-21 are schematic diagrams of leakage-frequency response curves of different positions relative to different acoustic output devices as described in FIG. 16 according to some embodiments of the present disclosure.

As shown in FIG. 17, leakage-frequency response curves L1-L4 of a first acoustic output device that includes a sound tube and a decompression hole that are disposed at two opposite sidewalls of the housing of the acoustic output device are provided. The first acoustic output device may be the same as or similar to the acoustic output device 600 as described in FIG. 6.

Figure 18:
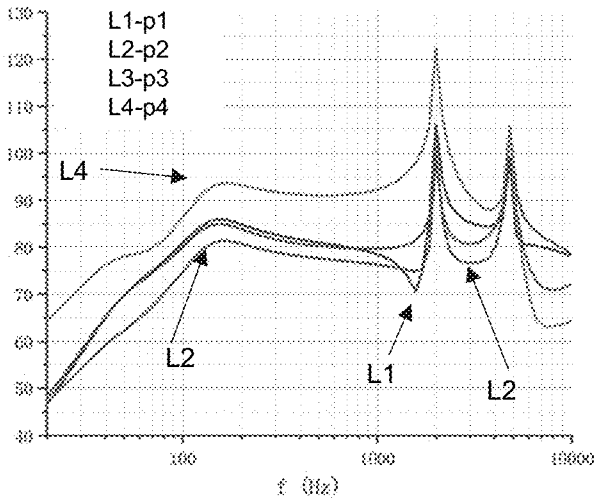

As shown in FIG. 18, leakage-frequency response curves L1-L4 of a second acoustic output device that includes a sound tube and a decompression hole that are disposed at two opposite sidewalls of the housing of the acoustic output device are provided. The second acoustic output device further includes at least one debugging hole that is disposed at the sidewall where the decompression hole is located. The second acoustic output device may be the same as or similar to the acoustic output device 1300 as described in FIG. 13.

Figure 19:
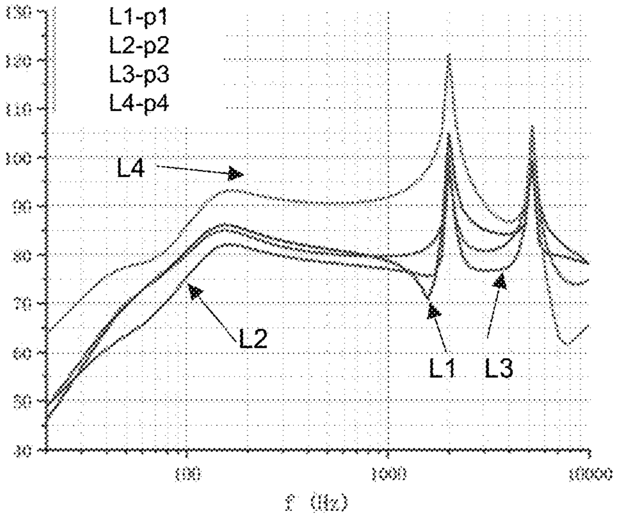

As shown in FIG. 19, leakage-frequency response curves L1-L4 of a third acoustic output device that includes a sound tube and a decompression hole that are disposed at two opposite sidewalls of the housing of the acoustic output device are provided. The third acoustic output device further includes at least one debugging hole that is disposed at the sidewall where the decompression hole is located. The third acoustic output device may be the same as or similar to the acoustic output device 1300 as described in FIG. 13. Different from the second acoustic output device, the volume of the back cavity of the third acoustic output device is smaller than that of the second acoustic output device.

Figure 20:
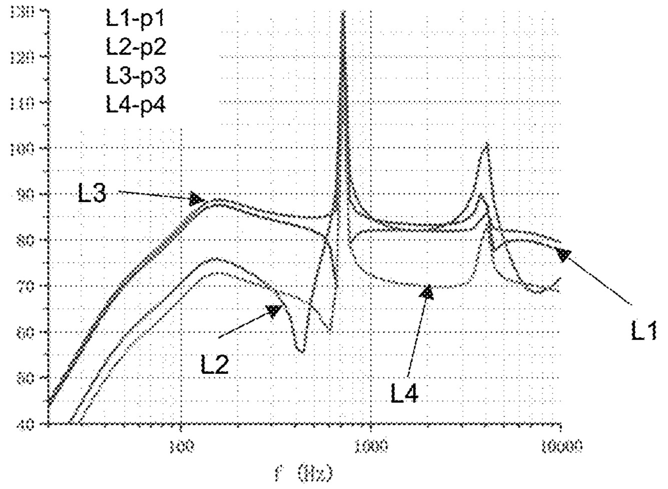

As shown in FIG. 20, leakage-frequency response curves L1-L4 of a fourth acoustic output device that includes a sound tube and a decompression hole that are disposed at two opposite sidewalls of the housing of the acoustic output device are provided. The fourth acoustic output device further includes at least one debugging hole that is disposed at the sidewall where the decompression hole is located. The fourth acoustic output device may be the same as or similar to the acoustic output device 1300 as described in FIG. 13. Different from the second acoustic output device, the sound tube, and the decompression hole are in flow communication with the debugging hole. In other words, the decompression hole and the debugging hole are not though holes.

Figure 21:
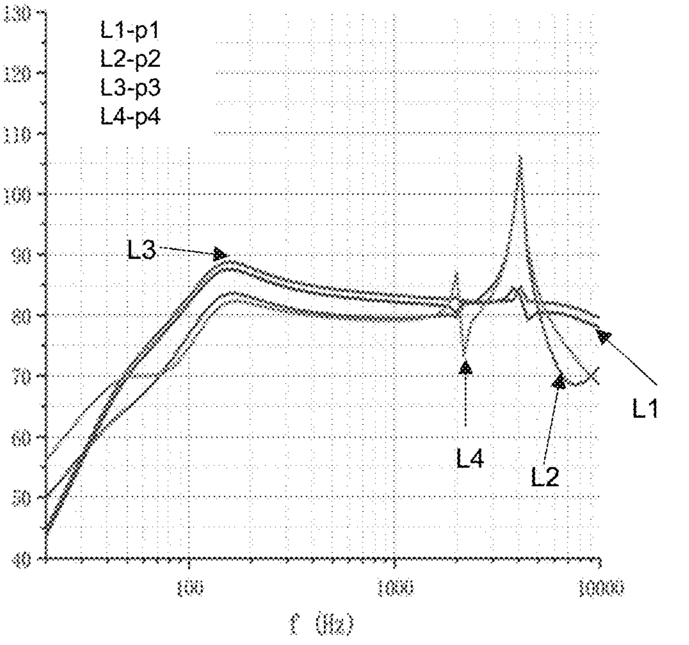

As shown in FIG. 21, leakage-frequency response curves L1-L4 of a fifth acoustic output device that includes a sound tube and a first decompression hole that are disposed at two opposite sidewalls of the housing of the acoustic output device are provided. The fourth acoustic output device further includes at least one debugging hole that is disposed at the sidewall where the first decompression hole is located. The fourth acoustic output device may be the same as or similar to the acoustic output device 1300 as described in FIG. 13. The sound tube and the first decompression hole are in flow communication with the debugging hole. In other words, the first decompression hole and the debugging hole are not through holes. Different from the fourth acoustic output device, the fifth acoustic output device further includes a second decompression hole that is disposed at the sidewall where the first decompression hole is located. The second decompression hole is a through-hole.

Figure 22:
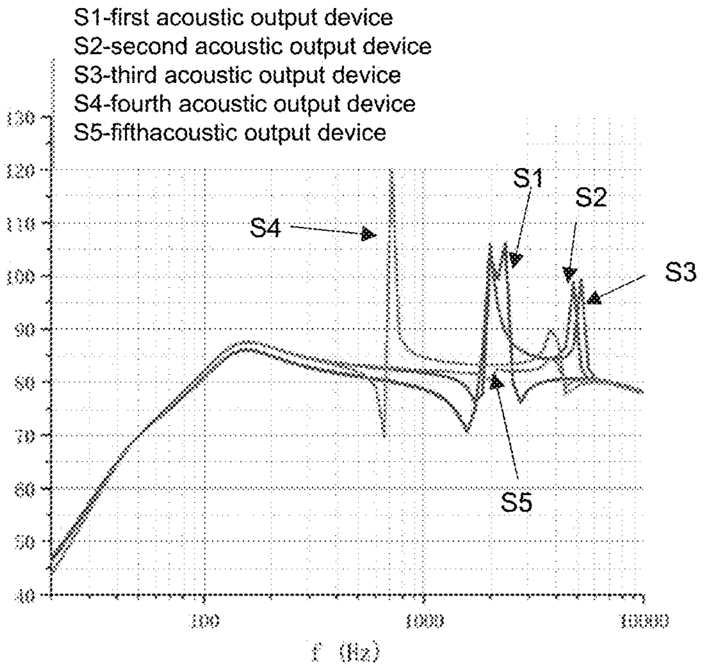
FIGS. 22-25 are schematic diagrams showing a comparison of leakage-frequency response curves of different acoustic output devices at each same position as described in FIG. 16 according to some embodiments of the present disclosure.
Figure 23:
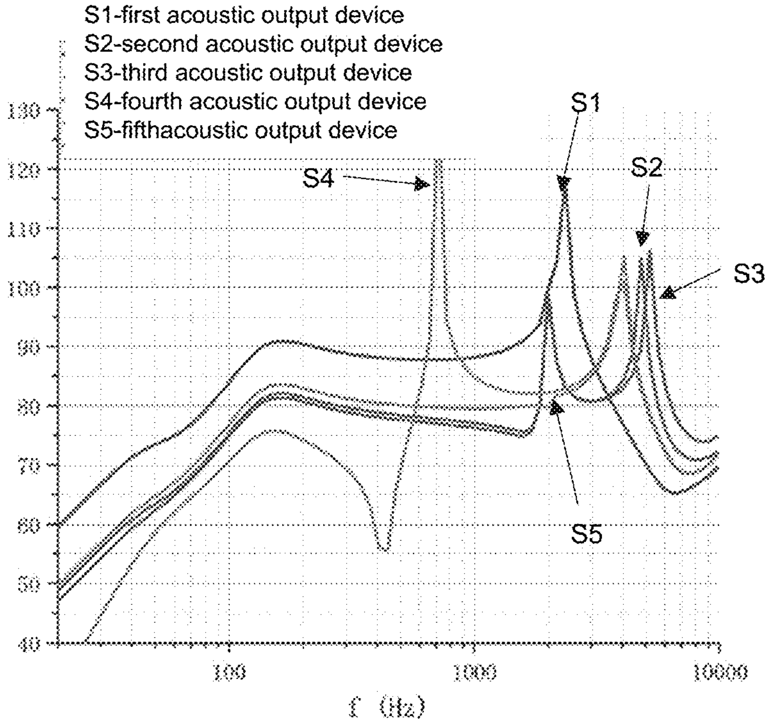
Figure 24:
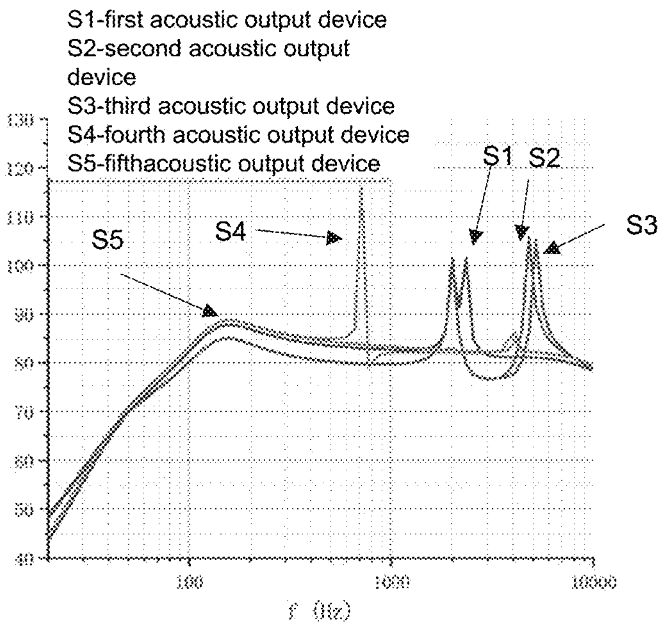
Figure 25:
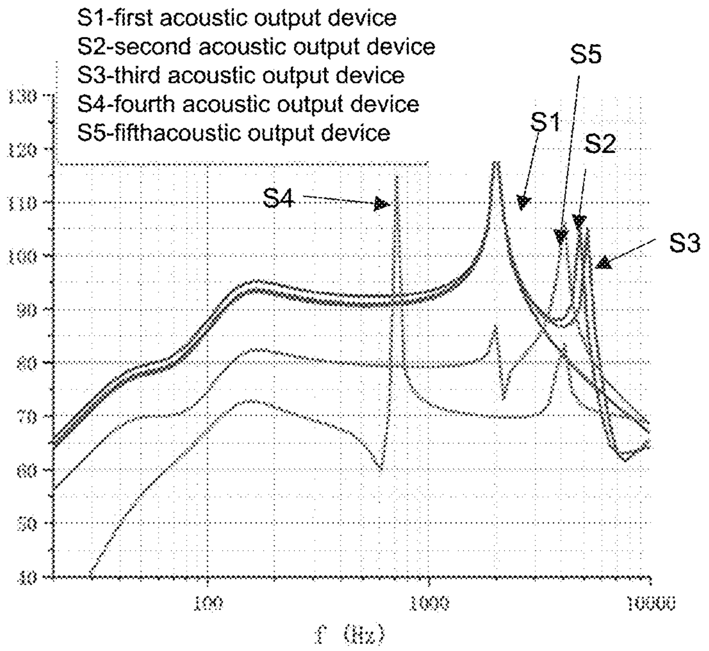

FIGS. 22-25 are schematic diagrams showing a comparison of leakage-frequency response curves of different acoustic output devices at each same position as described in FIG. 16 according to some embodiments of the present disclosure. As shown in FIG. 22, leakage-frequency response curves S1-S5 at position p1 of the first acoustic output device, the second acoustic output device, the third acoustic output device, the fourth acoustic output device, and the fifth acoustic output device as described in FIGS. 17-21 are provided. As shown in FIG. 23, leakage-frequency response curves S1-S5 at position p2 of the first acoustic output device, the second acoustic output device, the third acoustic output device, the fourth acoustic output device, and the fifth acoustic output device as described in FIGS. 17-21 are provided. As shown in FIG. 24, leakage-frequency response curves S1-S5 at position p3 of the first acoustic output device, the second acoustic output device, the third acoustic output device, the fourth acoustic output device, and the fifth acoustic output device as described in FIGS. 17-21 are provided. As shown in FIG. 25, leakage-frequency response curves S1-S5 at position p4 of the first acoustic output device, the second acoustic output device, the third acoustic output device, the fourth acoustic output device, and the fifth acoustic output device as described in FIGS. 17-21 are provided.

According to FIGS. 17-19 and 21, it may be inferred that the sound leakage under most frequencies exceeding 1000 Hz is greater than frequencies less than 1000 Hz.

According to FIG. 17, leakage-frequency response curves L1-L4 of the first acoustic output device that does not include a debugging hole at different positions p1-p4, especially at the front side p1 and the back side p3 include a first peak and a second peak at frequencies about 2000 Hz and 2200 Hz, respectively. The first peak at frequency 2000 Hz is caused by the front cavity of the first acoustic output device and the second peak at frequency 2200 Hz is caused by the back cavity of the first acoustic output device. According to FIG. 18, leakage-frequency response curves L1-L4 of the second acoustic output device that includes a debugging hole at different positions p1-p4, especially at the front side p1 and the back side p3 include a first peak and a second peak at frequencies about 2000 Hz and 4800 Hz. Comparing the leakage-frequency response curves L1-L4 of the first acoustic output device and the second acoustic output, it may be inferred that, the debugging hole causes the second peak caused by the back cavity toward the higher frequency. Therefore, the debugging hole may increase the resonance frequency (i.e., peaks in the leakage-frequency response curves L1-L4) of air in the back cavity. According to FIGS. 22-25, by comparing the leakage-frequency response curve S1 of the first acoustic output device and the leakage-frequency response curve S2 of the second acoustic output device in each of FIGS. 22-25, the sound leakage of the second acoustic output device at position p2 (i.e., the position around the sound tube) as the debugging hole, but the sound leakage of the second acoustic output device at other positions, such as p1, p3, and p4 does not change obviously.

According to FIG. 19, leakage-frequency response curves L1-L4 of the third acoustic output device that includes a back cavity with a lower volume than the second acoustic output device at different positions p1-p4 include two peaks at frequencies. Comparing the leakage-frequency response curves L1-L4 of the second acoustic output device and the third acoustic output, it may be inferred that, the second peak in FIG. 18 caused by the back cavity moves toward the higher frequency as the lower volume of the back cavity as shown in FIG. 19. According to FIGS. 22-25, by comparing the leakage-frequency response curve S2 of the second acoustic output device and the leakage-frequency response curve S3 of the third acoustic output device at each position of p1, p2, p3, and p4, the sound leakage of the third acoustic output device each position of p1, p2, p3, and p4 does not change obviously as the lower volume of the back cavity.

According to FIG. 20, leakage-frequency response curves L1-L4 of the fourth acoustic output device that includes the sound tube, the decompression hole and the debugging hole in flow communication include a first peak at frequency 700 Hz and a second peak at a frequency exceeding 1000 Hz. Comparing the leakage-frequency response curves L1-L4 of the fourth acoustic output device and the fifth acoustic output, it may be inferred that, the first peak in the FIG. 20 moves toward the lower frequency that is caused by the higher volume of a cavity as the front cavity and the back cavity are in flow communication. According to FIGS. 22-25, by comparing the leakage-frequency response curve S4 of the fourth acoustic output device and the leakage-frequency response curve S5 of the fifth acoustic output device, the sound leakage of the fourth acoustic output device positions p2 and p4 (i.e., positions at the sound tube and the decompression are decreased obviously, especially at low-mid frequencies).

According to FIG. 21, leakage-frequency response curves L1-L4 of the fifth acoustic output device that includes the sound tube, the first decompression hole, the second decompression hole, and the debugging hole in flow communication include a first peak and a second peak. Comparing the leakage-frequency response curves L1-L4 of the second acoustic output device and the fifth acoustic output, it may be inferred that, the second peak in FIG. 21 moves toward the higher frequency. According to FIGS. 22-25, by comparing the leakage-frequency response curve S2 of the second acoustic output device and the leakage-frequency response curve S5 of the fifth acoustic output device, the sound leakage of the fifth acoustic output device does not change obviously at position p2 (i.e., around the sound tube) relative to the second acoustic output device, but decreases obviously at position p4 (i.e., around the second decompression hole) relative to the second acoustic output device.

The basic concepts have been described above. Obviously, for those skilled in the art, the above detailed disclosure is only an example, and does not constitute a limitation to the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment", "an embodiment", and/or "some embodiments" mean a certain feature, structure, or characteristic related to at least one embodiment of the present disclosure. Therefore, it should be emphasized and noted that "one embodiment" or "one embodiment" or "an alternative embodiment" mentioned twice or more in different positions in this specification does not necessarily refer to the same embodiment. In addition, some features, structures, or features in the present disclosure of one or more embodiments may be appropriately combined.

In addition, those skilled in the art can understand that various aspects of the present disclosure can be explained and described through the number of patentable categories or situations, including any new and useful process, machine, product, or combination of substances, or for them Any new and useful improvements. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

The computer storage medium may contain a propagated data signal containing a computer program code, for example on a baseband or as part of a carrier wave. The propagation signal may have multiple manifestations, including electromagnetic forms, optical forms, etc., or a suitable combination. The computer storage medium may be any computer readable medium other than the computer readable storage medium, and the medium may be connected to an instruction execution system, device, or device to realize communication, propagation, or transmission of the program for use. The program code located on the computer storage medium can be transmitted through any suitable medium, including radio, cable, fiber optic cable, RF, or similar medium, or any combination of the above medium.

The computer program codes required for the operation of each part of the present disclosure can be written in any one or more programming languages, including object-oriented programming languages such as Java, Scala, Smalltalk, Eiffel, JADE, Emerald, C. The program code can be run entirely on the user's computer, or as an independent software package on the user's computer, or partly on the user's computer and partly on a remote computer, or entirely on the remote computer or server. In the latter case, the remote computer can be connected to the user's computer through any network form, such as a local area network (LAN) or a wide area network (WAN), or connected to an external computer (for example, via the Internet), or in a cloud computing environment, or as a service Use software as a service (SaaS).

In addition, unless explicitly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Some examples use numbers describing the number of ingredients and attributes. It should be understood that such numbers used in the description of the examples use the modifier "about", "approximately" or "substantially" in some examples. Retouch. Unless otherwise stated, "approximately", "approximately" or "substantially" indicate that the number is allowed to vary by ±20%. Correspondingly, in some embodiments, the numerical parameters used in the description and claims are approximate values, and the approximate values can be changed according to the required characteristics of individual embodiments. In some embodiments, the numerical parameter should consider the prescribed effective digits and adopt a general digit retention method. Although the numerical ranges and parameters used to confirm the breadth of the ranges in some embodiments of the present disclosure are approximate values, in specific embodiments, the setting of such numerical values is as accurate as possible within the feasible range.

For each patent, patent application, patent application publication and other materials cited in the present disclosure, such as articles, books, specifications, publications, documents, etc., the entire contents of which are hereby incorporated into the present disclosure by reference. The application history documents that are inconsistent or conflicting with the content of the present disclosure are excluded, and documents that restrict the broadest scope of the claims of the present disclosure (currently or later attached to the present disclosure) are also excluded. It should be noted that if there is any inconsistency or conflict between the description, definition, and/or term usage in the attached materials of the present disclosure and the content described in the present disclosure, the description, definition and/or term usage of the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, the embodiments of the present disclosure are not limited to the embodiments explicitly introduced and described in the present disclosure.

What is claimed is:

1. An apparatus for audio signal output, comprising:

a bone conduction assembly configured to generate a bone conduction acoustic wave;

an air conduction assembly configured to generate an air conduction acoustic wave, wherein the air conduction assembly includes one or more vibration diaphragms physically connected with at least one of the bone conduction assembly or the housing, the air conduction acoustic wave generating based on the one or more vibration diaphragms and the vibration of the at least one of the bone conduction assembly or the housing when the bone conduction assembly generates the bone conduction acoustic wave, the bone conduction acoustic wave and the air conduction acoustic wave represent a same audio signal, and a phase difference between the bone conduction acoustic wave and the air conduction acoustic wave is smaller than a threshold; and a housing configured to accommodate at least a portion of the bone conduction assembly and the air conduction assembly;

wherein at least one of the one or more vibration diaphragms includes a main portion physically connected with the bone conduction assembly and an auxiliary portion physically connected with the housing, the main portion including a base plate and a sidewall formed a sub-space to accommodate at least a portion of the bone conduction assembly; or, at least one of the one or more vibration diaphragms includes an annular structure, an inner wall of the vibration diaphragm surrounds the bone conduction assembly, and an outer wall of the vibration diaphragm is physically connected with the housing.

2. The apparatus of claim 1, wherein the housing includes a space where at least one of the one or more vibration diaphragms is located in, the space includes a first cavity and a second cavity defined by the at least one of the one or more vibration diaphragms, a first portion of the housing around the first cavity is physically connected with the bone conduction assembly and configured to transfer a vibration of the bone conduction assembly, and the air conduction acoustic wave is led out from the second cavity.

3. The apparatus of claim 2, wherein a second portion of the housing around the second cavity is configured with one or more first holes in flow communication with the second cavity, and the air conduction wave is let out from the first holes through the one or more first holes.

4. The apparatus of claim 3, wherein a sound tube is provided on each of the one or more first holes.

5. The apparatus of claim 3, wherein the first portion of the housing is configured with one or more second holes in flow communication with the first cavity, and the one or more second holes are configured to adjust an air pressure in the first cavity.

6. The apparatus of claim 5, wherein the one or more first holes are configured on a first sidewall of the housing, the one or more second holes are configured on a second sidewall of the housing, and the first sidewall is substantially parallel with the second sidewall.

7. The apparatus of claim 6, wherein the housing is configured with one or more third holes in flow communication with at least one of the first cavity or the second cavity.

8. The apparatus of claim 7, wherein at least one of the one or more second holes or the one or more third holes is covered by an acoustic resistance material.

9. The apparatus of claim 7, wherein at least one of the one or more third holes is configured on the second sidewall of the housing.

10. The apparatus of claim 7, wherein at least one of the one or more third holes is configured with a damping structure.

11. The apparatus of claim 1, wherein the auxiliary portion includes at least one of a concave area or a convex area.

12. The apparatus of claim 1, wherein at least one of the one or more vibration diaphragms is located between a bottom surface of the bone conduction assembly and a bottom surface of the housing.

13. The apparatus of claim 1, wherein the one or more vibration diaphragms include a first vibration diaphragm physically connected with the bone conduction assembly and a second vibration diaphragm physically connected with the housing.

14. The apparatus of claim 13, wherein a resonance frequency of a bottom surface of the housing when a user wears the apparatus is less than a threshold, the bottom surface of the housing being opposite to a sidewall of the housing that contacts with the user.

15. The apparatus of claim 1, wherein the air conduction assembly includes a vibration diaphragm and a vibration transmission assembly, the vibration transmission assembly is physically connected with the bone conduction assembly and the vibration diaphragm, and the vibration transmission assembly is configured to transfer the vibration of the bone conduction assembly to the vibration diaphragm to generate the air conduction acoustic wave.

16. The apparatus of claim 15, wherein the apparatus further includes a sound hole, the air conduction wave is let out from the sound hole, and the vibration diaphragm is arranged in the sound hole.

* * * * *